US010863230B1

(12) United States Patent
Pham et al.

(10) Patent No.: US 10,863,230 B1
(45) Date of Patent: Dec. 8, 2020

(54) CONTENT STREAM OVERLAY POSITIONING

(71) Applicant: Amazon Technologies, Inc., Seattle, WA (US)

(72) Inventors: Dominick Pham, Seattle, WA (US); Janet Galore, Seattle, WA (US); Xerxes Irani, Bainbridge Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/137,851

(22) Filed: Sep. 21, 2018

(51) Int. Cl.
*H04N 5/445* (2011.01)
*H04N 21/431* (2011.01)
*G06T 7/13* (2017.01)
*H04N 21/443* (2011.01)
*H04N 21/234* (2011.01)

(52) U.S. Cl.
CPC .......... *H04N 21/4316* (2013.01); *G06T 7/13* (2017.01); *H04N 21/23424* (2013.01); *H04N 21/4431* (2013.01)

(58) Field of Classification Search
CPC .......... H04N 21/4316; H04N 21/4431; H04N 21/23424
USPC ....................................................... 725/40
See application file for complete search history.

(56) References Cited

U.S. PATENT DOCUMENTS

| | | | | |
|---|---|---|---|---|
| 5,498,003 A * | 3/1996 | Gechter | .................. | A63F 13/52 463/1 |
| 5,715,416 A * | 2/1998 | Baker | ..................... | G06F 16/10 715/839 |
| 5,872,575 A * | 2/1999 | Segal | ...................... | G06T 15/00 345/473 |
| 6,065,042 A * | 5/2000 | Reimer | ................ | G11B 27/034 709/203 |
| 6,097,393 A * | 8/2000 | Prouty, IV | .......... | G06F 3/04815 345/419 |
| 6,282,713 B1 * | 8/2001 | Kitsukawa | ............. | G06Q 30/02 348/E5.105 |
| 6,409,602 B1 * | 6/2002 | Wiltshire | ................ | A63F 3/081 463/16 |

(Continued)

OTHER PUBLICATIONS

U.S. Appl. No. 16/137,406, "Synchronize and Present Multiple Live Content Streams," filed Sep. 20, 2018.

*Primary Examiner* — Michael B. Pierorazio
(74) *Attorney, Agent, or Firm* — Kilpatrick Townsend & Stockton LLP

(57) ABSTRACT

Techniques described herein include systems and methods for identifying areas of a user interface to position overlay content without obscuring primary content. A scene in a content stream may be identified based on one or more user interface elements included in the content stream. Boundaries and positions of the one or more user interface elements may be identified in the scene based on an edge detection algorithm. A prominence value may be determined for a container that corresponds to an area of a user interface that includes the one or more user interface elements based on aggregate user input for the scene. Instructions for updating the scene may be transmitted to a user device to incorporate an overlay that includes containers that correspond to areas of the user interface that enables a user to place an overlay user interface element in a particular container based on the prominence value.

19 Claims, 16 Drawing Sheets

(56) References Cited

U.S. PATENT DOCUMENTS

| | | | |
|---|---|---|---|
| 6,658,662 B1* | 12/2003 | Nielsen | H04N 7/16 348/E7.054 |
| 7,000,242 B1* | 2/2006 | Haber | G06Q 30/02 725/43 |
| 7,054,831 B2* | 5/2006 | Koenig | G06Q 30/02 463/1 |
| 7,162,197 B2* | 1/2007 | Kitamura | A63H 33/38 434/317 |
| 7,671,893 B2 | 3/2010 | Li et al. | |
| 7,715,642 B1* | 5/2010 | Collins | G06T 13/00 345/629 |
| 8,043,156 B2* | 10/2011 | Ackley | A63F 13/12 463/23 |
| 8,079,054 B1* | 12/2011 | Dhawan | G06Q 30/00 725/105 |
| 8,221,220 B2* | 7/2012 | Ackley | A63F 13/332 463/23 |
| 8,613,020 B2* | 12/2013 | Knudson | H04N 21/4316 725/42 |
| 8,893,173 B2* | 11/2014 | Briggs | H04N 21/435 725/32 |
| 8,910,201 B1* | 12/2014 | Zamiska | H04N 21/44222 725/34 |
| 8,925,019 B2 | 12/2014 | Ko et al. | |
| 9,438,937 B1 | 9/2016 | Buchheit | |
| 9,454,993 B1 | 9/2016 | Lawson et al. | |
| 9,462,340 B1* | 10/2016 | Mathurin | H04N 21/234336 |
| 9,516,373 B1* | 12/2016 | Abecassis | H04N 21/4307 |
| 9,596,502 B1* | 3/2017 | Abecassis | H04N 21/84 |
| 9,973,827 B2* | 5/2018 | Walker | G06Q 10/00 |
| 10,403,042 B2* | 9/2019 | Roveta | G06T 19/006 |
| 10,687,106 B2 | 6/2020 | Afshar et al. | |
| 2001/0001160 A1* | 5/2001 | Shoff | H04N 5/44543 725/51 |
| 2001/0037303 A1* | 11/2001 | Mizrahi | G06Q 20/123 705/52 |
| 2001/0039571 A1* | 11/2001 | Atkinson | G06Q 30/02 709/217 |
| 2002/0033844 A1* | 3/2002 | Levy | G06F 21/10 715/744 |
| 2002/0052746 A1* | 5/2002 | Handelman | H04N 7/163 704/270 |
| 2002/0069405 A1* | 6/2002 | Chapin | H04N 7/162 725/32 |
| 2002/0133562 A1* | 9/2002 | Newnam | G06Q 30/02 709/216 |
| 2002/0144262 A1* | 10/2002 | Plotnick | G11B 27/005 725/32 |
| 2002/0162117 A1* | 10/2002 | Pearson | H04N 5/445 725/109 |
| 2003/0056212 A1* | 3/2003 | Siegel | H04N 5/913 725/31 |
| 2003/0149618 A1* | 8/2003 | Sender | G06Q 30/02 705/14.55 |
| 2003/0149975 A1* | 8/2003 | Eldering | H04N 7/17318 725/34 |
| 2003/0217210 A1* | 11/2003 | Carau, Sr. | G06F 1/26 710/302 |
| 2004/0068536 A1* | 4/2004 | Demers | H04L 29/06027 709/201 |
| 2004/0073493 A1* | 4/2004 | Kato | G06Q 30/02 705/500 |
| 2004/0255322 A1* | 12/2004 | Meadows | H04N 7/17309 725/23 |
| 2005/0066352 A1* | 3/2005 | Herley | H04N 7/16 725/19 |
| 2005/0132398 A1* | 6/2005 | Baran | G06Q 30/02 725/28 |
| 2005/0144024 A1* | 6/2005 | Wojton | G06Q 10/10 705/319 |
| 2005/0267813 A1* | 12/2005 | Monday | G06Q 30/02 705/26.1 |
| 2006/0123451 A1* | 6/2006 | Preisman | H04N 7/17318 725/86 |
| 2006/0184579 A1* | 8/2006 | Mills | H04N 7/173 |
| 2006/0291483 A1* | 12/2006 | Sela | H04L 12/66 370/401 |
| 2007/0271580 A1* | 11/2007 | Tischer | H04H 60/07 725/35 |
| 2008/0015864 A1* | 1/2008 | Ross | G10L 15/1822 704/275 |
| 2008/0052750 A1* | 2/2008 | Grunnet-Jepsen | H04N 7/17318 725/109 |
| 2008/0089659 A1* | 4/2008 | Clapper | H04N 21/858 386/353 |
| 2008/0115161 A1* | 5/2008 | Kurzion | G06Q 30/02 725/32 |
| 2008/0115655 A1* | 5/2008 | Weng | G10H 1/0008 84/609 |
| 2008/0187279 A1* | 8/2008 | Gilley | G06Q 30/02 386/250 |
| 2008/0221986 A1* | 9/2008 | Soicher | G06Q 30/02 705/14.36 |
| 2008/0282283 A1* | 11/2008 | Hilton | G06Q 20/12 725/5 |
| 2008/0285940 A1* | 11/2008 | Kulas | G11B 27/3027 386/248 |
| 2008/0295129 A1* | 11/2008 | Laut | H04N 21/812 725/34 |
| 2009/0024922 A1 | 1/2009 | Markowitz et al. | |
| 2009/0094632 A1* | 4/2009 | Newnam | H04N 7/17318 725/24 |
| 2009/0217316 A1* | 8/2009 | Gupta | G06Q 30/0269 725/32 |
| 2009/0281908 A1* | 11/2009 | Wong | G11B 27/034 705/26.1 |
| 2009/0293081 A1* | 11/2009 | Pirani | H04N 7/17318 725/25 |
| 2009/0299752 A1* | 12/2009 | Rodriguez | D06F 58/28 704/275 |
| 2010/0131385 A1* | 5/2010 | Harrang | G06Q 30/00 705/26.1 |
| 2010/0225811 A1 | 9/2010 | Konvisser | |
| 2010/0256561 A1* | 10/2010 | Gillespie, Jr. | A61M 5/142 604/151 |
| 2010/0275224 A1* | 10/2010 | Sheng | H04H 20/38 725/14 |
| 2010/0283741 A1* | 11/2010 | Heintze | G06F 3/0238 345/173 |
| 2010/0332570 A1* | 12/2010 | Roberts | H04N 21/252 707/912 |
| 2011/0137753 A1* | 6/2011 | Moehrle | H04N 21/2547 705/27.1 |
| 2011/0138326 A1* | 6/2011 | Roberts | G06Q 30/02 715/808 |
| 2011/0167456 A1* | 7/2011 | Kokenos | H04N 21/812 725/60 |
| 2011/0276334 A1* | 11/2011 | Wang | G10L 25/48 704/270 |
| 2011/0289536 A1* | 11/2011 | Poder | H04H 60/97 725/95 |
| 2011/0310580 A1* | 12/2011 | Leung | G06F 1/1618 361/807 |
| 2012/0016678 A1* | 1/2012 | Gruber | G10L 13/02 704/275 |
| 2012/0084811 A1* | 4/2012 | Thompson | H04N 21/44222 725/34 |
| 2012/0084812 A1* | 4/2012 | Thompson | H04N 21/25891 725/34 |
| 2012/0110620 A1* | 5/2012 | Kilar | G06Q 30/02 725/34 |
| 2012/0307145 A1 | 12/2012 | Buchheit | |
| 2013/0141529 A1 | 6/2013 | Sathish | |
| 2013/0304795 A1* | 11/2013 | Kang | H04L 67/10 709/202 |
| 2014/0053214 A1 | 2/2014 | Walker et al. | |

(56) References Cited

U.S. PATENT DOCUMENTS

| | | | |
|---|---|---|---|
| 2014/0109161 A1* | 4/2014 | Chang | H04M 1/72527 |
| | | | 725/110 |
| 2014/0195675 A1 | 7/2014 | Silver | |
| 2014/0229980 A1* | 8/2014 | Bill | G06Q 30/02 |
| | | | 725/34 |
| 2014/0250477 A1* | 9/2014 | Kang | H04N 21/4334 |
| | | | 725/110 |
| 2014/0278834 A1* | 9/2014 | Lautz | G06Q 30/0203 |
| | | | 705/12 |
| 2015/0249846 A1 | 9/2015 | Klein et al. | |
| 2015/0350733 A1 | 12/2015 | Persidis | |
| 2016/0037189 A1 | 2/2016 | Holden et al. | |
| 2016/0077573 A1* | 3/2016 | Lee | H04L 12/12 |
| | | | 713/310 |
| 2016/0110877 A1 | 4/2016 | Schwartz et al. | |
| 2016/0127763 A1 | 5/2016 | Patel et al. | |
| 2016/0267879 A1 | 9/2016 | Champel et al. | |
| 2017/0055004 A1 | 2/2017 | Krietzman et al. | |
| 2017/0171577 A1 | 6/2017 | Kipp | |
| 2017/0251231 A1 | 8/2017 | Fullerton et al. | |
| 2017/0332131 A1 | 11/2017 | Opsenica et al. | |
| 2018/0077467 A1 | 3/2018 | Novobilski | |
| 2018/0109849 A1 | 4/2018 | Moran et al. | |
| 2018/0227586 A1 | 8/2018 | Choi et al. | |
| 2018/0255332 A1 | 9/2018 | Heusser | |
| 2018/0270516 A1 | 9/2018 | Dalbec et al. | |
| 2018/0288470 A1 | 10/2018 | Jeyachandran et al. | |
| 2019/0208234 A1 | 7/2019 | Van Brandenburg et al. | |
| 2019/0267041 A1 | 8/2019 | Ricciardi | |
| 2019/0297370 A1 | 9/2019 | Afshar et al. | |
| 2020/0107083 A1 | 4/2020 | Holden et al. | |
| 2020/0169793 A1 | 5/2020 | åkerfeldt | |

\* cited by examiner

CONTENT STREAM OVERLAY POSITIONING

BACKGROUND

Live streaming content providers can enable users to explore, interact, and consume a variety of events (live sports games, live video game eSport events, live video game streaming content, etc.,) and thereby explore a variety of real, virtual or non-real (e.g., fantasy or sci-fi) environments from the safety and comfort of their own homes. As streaming technology advances and the audience demand increases, more live streaming content providers seek to engage more users by providing more overlay user interface element options and configurations for content providers to utilize. However, content providers may place or utilize a configuration of overlay elements that obscure important or relevant content in the content they are streaming from an audience viewpoint. Conventional technology solutions may continue to obscure more and more of a limited user interface real estate thereby further impact the user's consuming experience of the content.

BRIEF DESCRIPTION OF THE DRAWINGS

Various embodiments in accordance with the present disclosure will be described with reference to the drawings, in which.

DETAILED DESCRIPTION

Figure 1:
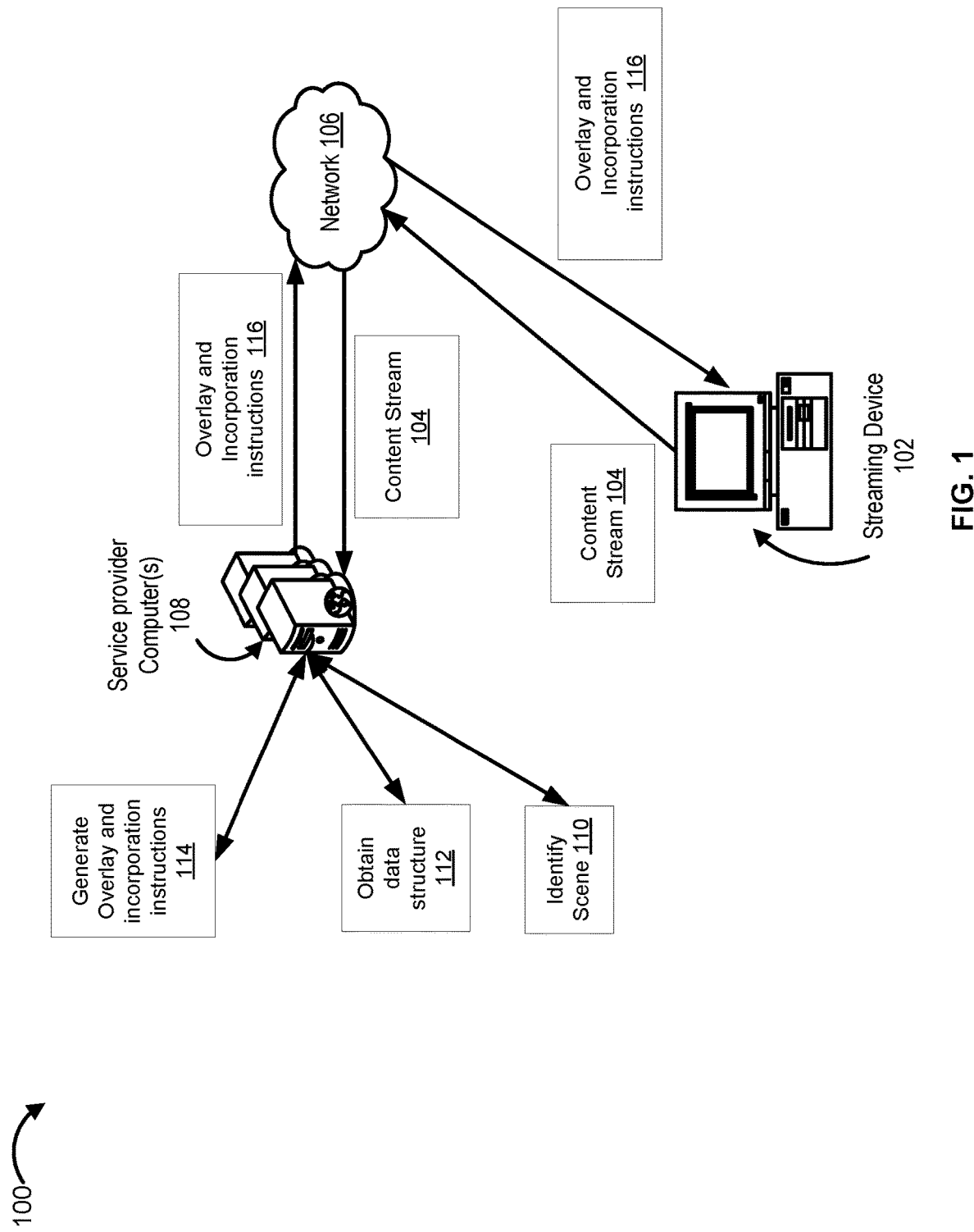
FIG. 1 illustrates a workflow of an overlay modification feature, in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein provide for implementation of an overlay modification feature that identifies areas of a user interface that present a content stream to identify boundaries, positions, and prominence values for the areas that can be used to generate an overlay. In embodiments, the overlay may be used to guide users in placing overlay user interface elements while avoiding obscuring primary or prominent content presenting areas of the user interface from a viewer's viewpoint (e.g., a user who is consuming or viewing the content stream). In accordance with at least one embodiment, an overlay user interface element may correspond to user interface elements that include content that is different from the content included in the content stream, such as a web camera feed of a video game content streamer, that may obscure, replace, or otherwise change the presentation that is presented to a user that is consuming the content. In embodiments, content streams may be comprised of one or more scenes where each scene includes a configuration of one or more visual elements. In embodiments, a visual element may include user interface elements, objects, or an environmental cue in a scene of a content stream. For example, a scene in a video game application may include user interface elements that correspond to a player's avatar, the player's health bar, the player's score, a chat window, a mini-map, a background, and one or more other appropriate elements such as enemy avatars, scenery, buildings, etc. In accordance with at least one embodiment, the overlay modification feature may dynamically update the overlay from scene to scene in the content stream (e.g., as a content provider progresses through a video game) or from content stream to content stream (e.g., as a content provider switches from one video game to another video game). In embodiments, a scene for a content stream may include a frame of the content stream or an architecture of a series of frames. A scene may include visual elements that are dynamically updated from frame to frame or a scene may include visual elements that remain fixed within a series of frames.

In embodiments, a service provider computer implementing the overlay modification features described herein may generate and maintain a library of data structures based on user input. A data structure of the data structures may correspond to a particular scene of a content stream and the library may include a plurality of data structures that correspond to each scene that comprises the content stream as well as other content streams or pieces of content. In embodiments, a data structure may define or identify boundaries for one or more containers that are associated with user interface elements included in a scene or areas of a scene as presented in a user interface. The data structure may also define or identify X and Y coordinates for each container or area, a width and a height for each container or area, and a prominence value for each container or area with respect to or corresponding to the user interface presenting the content stream or piece of content. The service provider computer may generate, update, and maintain the library of data structures based at least in part on user input. For example, users who view the content stream may provide input as to the positions, sizes, and prominence values of the containers or areas that correspond to UI elements included in a scene of content. A content provider or author of a piece of content may provide input which can be used to generate the data structures maintained in the library of data structures by the service provider computer implementing the overlay modification feature. In accordance with at least one embodiment, a prominence value may represent an importance that an area or container in a scene of a content stream be unobscured or otherwise unobstructed from the view point of a consuming user (e.g., a user viewing or consuming the content). In embodiments, the larger or higher a prominence value is for a container or area in a user interface, the more likely that the overlay will prevent overlay UI elements from being placed in the corresponding position, size, etc., to avoid obscuring or obstructing certain portions of the user interface which present content included in the content stream. For example, the service provider computer may utilize prominence values to prohibit a content provider from providing input or placing an overlay UI element in a position or defining a size of the overlay UI element such that when the overlay is combined or interleaved with the content stream the resultant updated user interface would obscure certain portions of the content stream from the viewpoint of a viewer of the content stream.

In accordance with at least one embodiment, the service provider computer may receive an indication of a change of scene in a content stream or identify that a scene has changed in a content stream using image recognition techniques. In response to identifying a change in a scene for a content stream, the service provider computer may identify an appropriate data structure to utilize for the updated scene of the content stream. In accordance with at least one embodiment, the service provider computer may identify boundaries (sizes) and positions (coordinates or X and Y coordinates) of user interface elements included in a scene based at least in part on computer vision techniques such as edge detection algorithms. In embodiments, the service provider computer may use the information identified with the edge detection algorithm to identify areas or containers within a scene to associate with the user interface elements and other portions of the user interface for use in generating the overlay. In embodiments, the service provider computer may determine a prominence value for each area or container in the user interface based at least in part on aggregate user input (e.g., content providers, authors of content, and users who view or consume the content).

In accordance with at least one embodiment, the service provider computer may identify boundaries (sizes), positions (coordinates or X and Y coordinates), and prominence values of user interface elements included in a scene based at least in part on invoking an application programming interface (API) call of a video game application of a content provider computer or user device to request information that includes the boundaries, positions, and prominence values. In embodiments, the service provider computer may use the information requested via the API call to identify areas or containers within a scene to associate with the user interface elements and other portions of the user interface for use in generating the overlay. In embodiments, the overlay may be configured to receive input from a user, such as a content provider, for placing overlay user interface elements into the overlay which will be incorporated or included in the user interface that is presented to a content consumer or user who is viewing the content stream. The overlay may be configured to visually represent the sizes, boundaries, and positions of the areas or containers included in a scene as well as associated prominence values which can be used to guide a user when placing the overlay UI elements. For example, a large center area of a scene may have a high prominence value which represents the main viewing space of the viewing user and corresponds to a video game avatar for the content provider. As the content provider interacts with a user device to provide input which corresponds to adding or updating an overlay UI element in the overlay, the user may be prohibited from placing an overlay UI element in the previously described center area of scene based on the associated prominence value. In embodiments, the service provider computer may maintain one or more thresholds which can be used with the prominence values to allow or prohibit placement of overlay UI elements or reduce the size over overlay UI elements within the overlay (e.g., prohibit placement of an overlay UI element in an area or container with a prominence value of seven (out of ten) or higher).

In embodiments, the overlay may be configured to visually represent the prominence values (such as a numeric value or number) that corresponds to each container or area of a scene. In some embodiments, the overlay may visually represent the prominence values for areas or containers in the overlay using a color gradient where the color green and brighter colors of green indicating a safe area for a user to place an overlay UI element and red and darker red colors indicating a prohibited area for a user to place an overlay UI element. In accordance with at least one embodiment, the overlay modification feature implemented by the service provider computers may attempt to resize content, remove portions of content, or reduce the quality of content associated with an overlay UI element to conform to the boundaries, size, and position of a corresponding container or area of an overlay for a scene in a content stream. For example, the overlay may be configured to reduce the size of an overlay UI element or the corresponding content included in the overlay UI element to properly fit into a designated area within the overlay and avoid violating prominence values of approximately close areas or containers within the overlay. In embodiments, the overlay modification feature may use content specific policies to remove portions of the content corresponding to an overlay UI element to conform to the constraints of an area or container within the overlay for the scene. For example, a policy associated with text content may identify the removal of a title and associated images for certain text content to conform to a container or area. In embodiments, the overlay may be configured to automatically move a position of an overlay UI element back to a previous position when a user provides input in an attempt to place the overlay UI element in a container or area that is of an incorrect size or violates the corresponding prominence value (e.g., the prominence value exceeds a certain threshold and therefore indicates that no overlay UI element should be placed in the corresponding container or area).

The processes and systems described herein may be an improvement on conventional overlay software applications and content streaming applications. For example, conventional applications do not identify a change in a scene during the playback or presentation of a content stream which can result in awkward and obscuring overlay elements being positioned to block a viewing user from viewing or consuming certain portions of the presented content. Furthermore, conventional applications typically use static placement of overlay elements that require manual input from the content provider to position and size which again does not account for changes in scenes (e.g., placement of user interface elements that occur between scenes of a piece of content) nor do they account for user preferences which may vary between viewers and indicate what they would like to see and what they would care less about seeing in a piece of content. The methods and systems described herein provide for more dynamic identification and generation of overlay features which can account for changes in scenes and utilize input from users to assign and update prominence values to certain areas of the user interface. The overlay modification features described herein can aid and enable a content provider to place overlay UI elements in an overlay that will be incorporated into a content stream that will avoid obscuring or blocking prominent areas of the user interface that viewers would like to view or consume when interacting with the content stream. The service provider computers implementing the overlay modification features can utilize data structures, computer vision techniques, or information requested from an application to determine sizes, positions, and prominence values of areas or containers of the user interface that correspond to user interface elements and other areas of the UI. The areas or containers and associated prominence values can be used to graphically represent areas that are preferred or safe to place overlay UI elements and areas which are better avoided to place overlay UI elements and thus enhance the overall viewing experience for a user who will consume the combined presentation of overlay and content stream on a user device.

FIG. 1 illustrates a workflow of an overlay modification feature, in accordance with at least one embodiment. Workflow 100 of FIG. 1 includes a streaming device 102 transmitting content stream (stream of content) 104, via network 106, to service provider computers 108. The service provider computers 108 may implement the overlay modification features described herein. In embodiments, the streaming device 102 may be operated or associated with a content provider. For example, a user may live stream a video game via the streaming device 102 and provide it for consumption by viewers via a content provider platform associated with service provider computers 108. The content stream 104 may include content captured by the streaming device 102. In embodiments, the service provider computers 108 may receive the content stream 104 via network 106 and analyze the content stream 104 to identify a scene 110 within the content stream 104. As described herein, the service provider computers 108 may utilize image recognition techniques, edge detection techniques, or other techniques for identifying a particular scene in a content stream (content stream 104) or in a piece of content (such as a particular scene in a movie). In embodiments, an application of the streaming device 102 may be configured to associate each scene with an indicator or identifier that can be utilized by service provider computers 108 to identify the scene. For example, each piece of content may include a plurality of identifiers where each identifier is associated with a particular scene that comprises the content.

In embodiments, the workflow 100 of FIG. 1 includes the service provider computers 108 obtaining a data structure at 112. The overlay modification features implemented by the service provider computers 108 may include maintaining a library of data structures that identify information for areas or containers of an overlay for a particular scene included in a piece of content such as content stream 104. In embodiments, the service provider computers 108 may obtain 112 the appropriate data structure 112 based on identifying the scene 110. In accordance with at least one embodiment, the service provider computers 108 may generate a data structure for a scene based at least in part on input provided by a content provider associated with streaming device 102. The data structure 112 may define or identify X and Y coordinates for each container or area of a user interface, a width and a height for each container or area, and a prominence value for each container or area with respect to or corresponding to the user interface presenting the content stream (104) or piece of content.

The workflow 100 of FIG. 1 includes the service provider computers 108 generating the overlay and incorporation instructions (instructions for incorporating the overlay into the content stream 104) at 114. The overlay may include the areas or containers defined in the data structure 112 as well as enable a user, such as the user associated with streaming device 102, to place or provide input that places overlay user interface elements over the content stream 104 or for use in the content stream 104 by being incorporated into the content stream 104. The service provider computers 108 may transmit the overlay and incorporation instructions 116 via network 106 to the streaming device 102. As described herein, the overlay 114 may visually represent boundaries, positions, and prominence values for the areas or containers of the user interface that is presenting the scene of the content stream 104 via the streaming device 102. The overlay may be configured to resize or remove portions of an overlay UI element that the user associated with the streaming device 102 attempts to place into a particular container or area. The overlay may be configured to move an overlay UI element back to a previous position in response to an attempt by a user to place the overlay UI element into an area or container with a high prominence value. For example, the user associated with streaming device 102 may attempt to place an overlay UI element into an area that has a corresponding prominence value that exceeds a threshold (e.g., a prominence value of 8 exceeding a prominence value threshold of 6). In response to the attempt to place the overlay UI element into the area, the overlay may be configured to automatically move the overlay UI element to a previous position within the overlay of the user interface.

Figure 2:
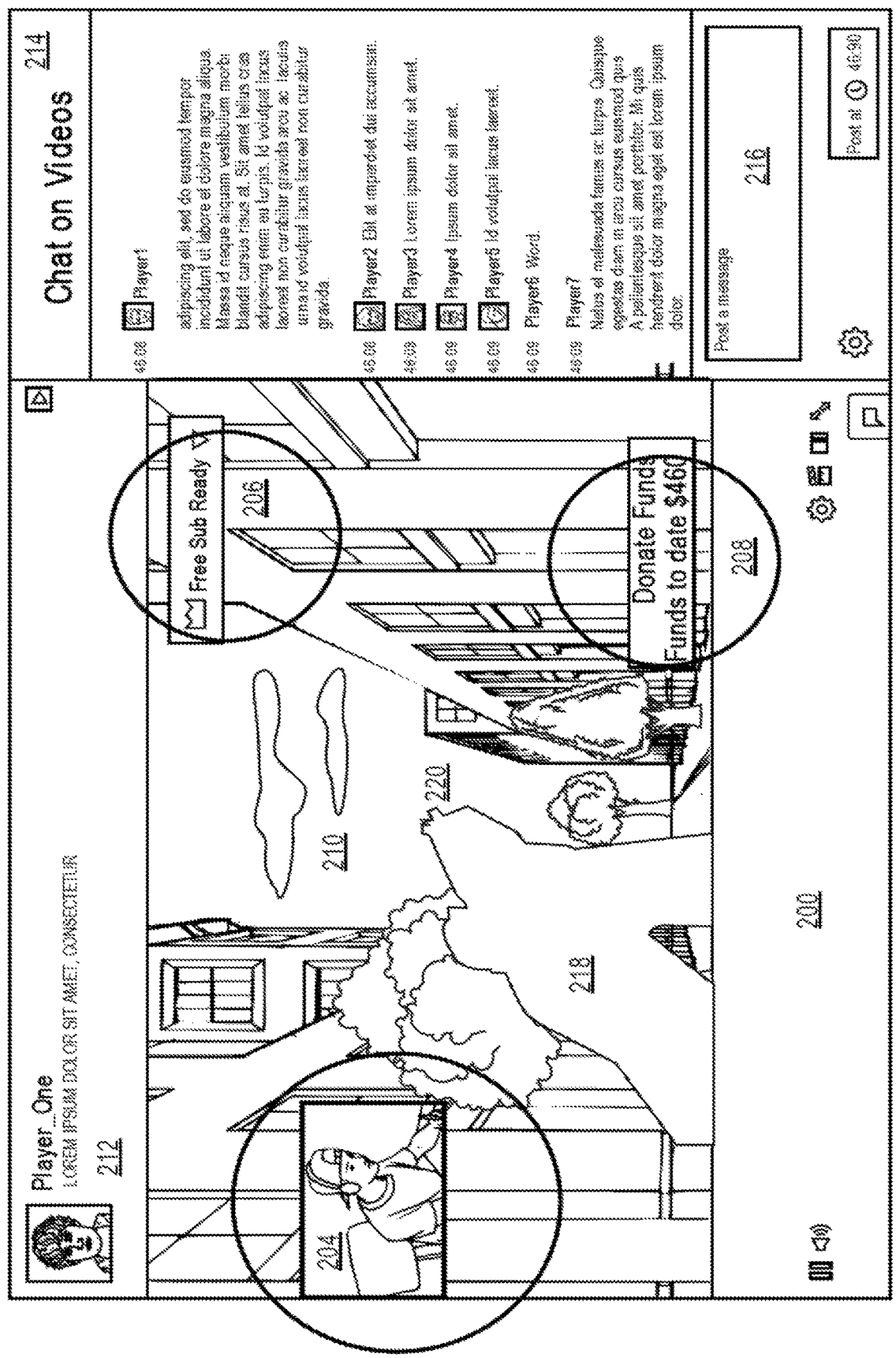
FIG. 2 illustrates an example user interface presenting streaming content, in accordance with at least one embodiment.

FIG. 2 illustrates an example user interface presenting streaming content, in accordance with at least one embodiment. FIG. 2 depicts user interface 200 utilizing a conventional overlay application to place overlay UI elements 204, 206, and 208 (illustrated as elements within the corresponding circles). The user interface 200 depicted in FIG. 2 presents a video game application 210 shared by a content providing platform that includes a player identification information 212 as well as an associated chat portion 214 where users can provide chat input 216. The overlay UI element 204 corresponds to a web camera feed of the player (212) who is playing the video game application 210. The overlay UI element 206 corresponds to a subscription UI element that a viewing user can interact with to subscribe or follow to the player 212. The overlay UI element 208 corresponds to a donation UI element that a viewing user can interact with to donate money to the player 212.

As depicted in FIG. 2, several portions or areas of the user interface 200 are obscured by the overlay UI elements 204, 206, and 208. The video game application 210 presented by user interface 200 also has several portions obscured by the overlay UI elements 204, 206, and 208 from the viewpoint of a viewer or content consumer of the content stream associated with the player 212. As illustrated in FIG. 2, the video game application 210 has a primary portion or area of content 218 that corresponds to a weapon wielded by the in-game avatar of player 212 for the video game application 210. In conventional overlay UI applications or user interface applications that utilize overlay elements, users may provide input or place the overlay UI elements 204, 206, and 208 in any area or portion of user interface 200. For example, the user (player 212) may provide input to move overlay UI element 204 to position 220 which would obscure the primary portion or area of content 218 from viewers who are consuming the content provided by user interface 200.

Figure 3:
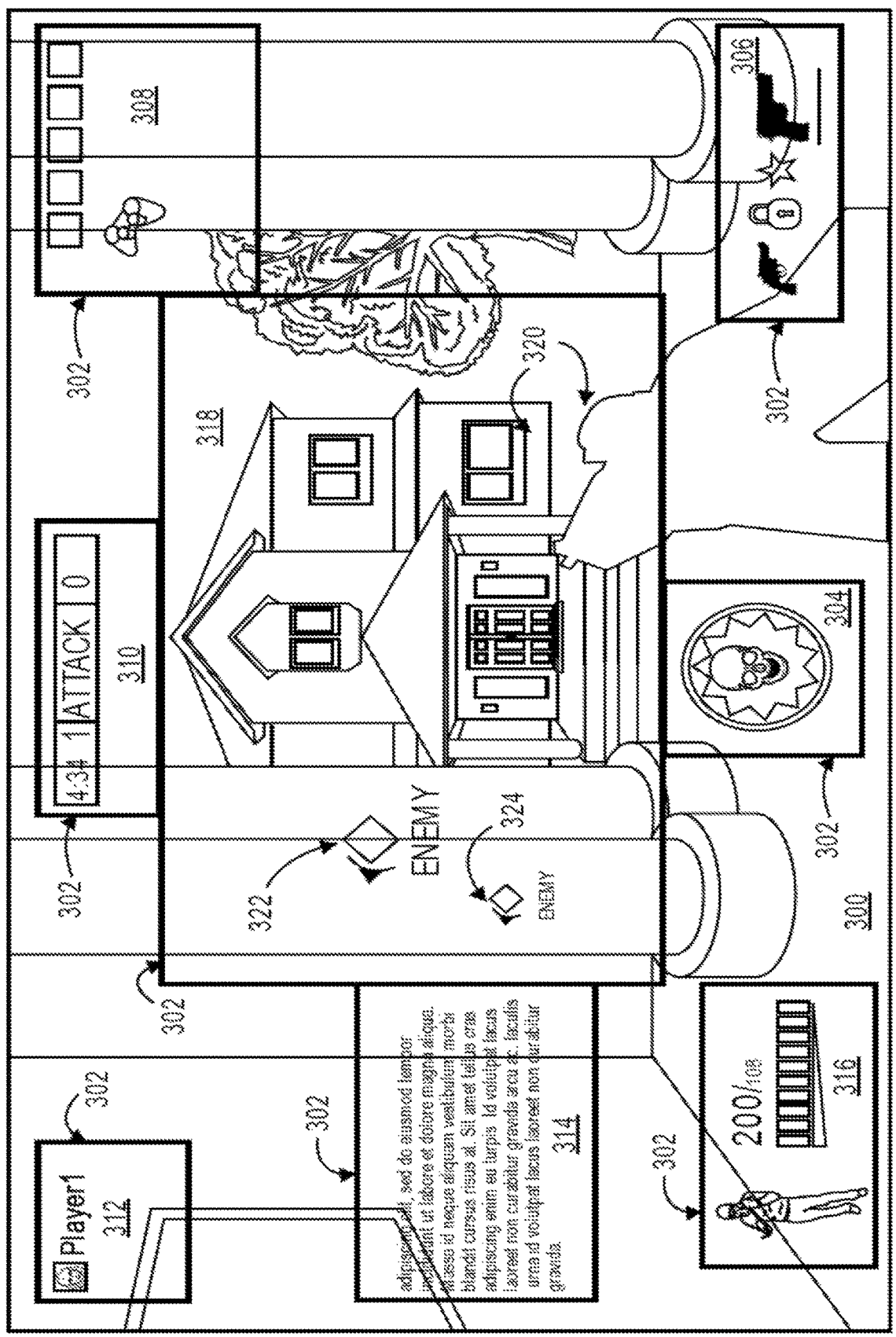
FIG. 3 illustrates an example user interface implementing an overlay modification feature, in accordance with at least one embodiment.

FIG. 3 illustrates an example user interface implementing an overlay modification feature, in accordance with at least one embodiment. FIG. 3 includes user interface 300 as well as a graphical representation of a plurality of boundaries 302 for one or more containers or areas 304-318 for a scene 320 presented via user interface 300. The user interface 300 depicts one or more UI elements included in the containers or areas 304-318 as well as UI elements 322 and 324 which all correspond to UI elements provided by a video game application. In accordance with at least one embodiment, the overlay modification feature may graphically represent the boundaries 302 for the one or more containers or areas 304-318 for a scene 320 in an incorporated overlay for a content stream generated by a streaming device (not pictured). In embodiments, the boundaries 302 may be determined based at least in part on a data structure for the scene 320 where the data structure identifies boundaries 302, sizes and positions of containers or areas 304-318, and prominence values for the containers or areas 304-318.

In embodiments, the boundaries 302 graphically presented via user interface 300 may aid a user in placing overlay UI elements that would avoid obscuring UI elements included in containers or areas 304-318. The boundaries 302 may correspond to sizes and positions of the UI elements that can guide or enable a user to place or provide input that would put an overlay UI element to obscure content such as the UI elements included in containers or areas 304-318. In accordance with at least one embodiment, the service provider computer implementing the overlay modification feature may determine the boundaries 302 for user interface elements within containers or areas 304-318 based on computer vision techniques such as edge detection algorithms. Prominence values associated with each area or container of the areas or containers 304-318 may be determined based at least in part on aggregate input from users. In embodiments, a video game application associated with the content presented via user interface 300 may, upon request via an API call, provide boundaries, sizes, locations, and prominence values for containers or areas 304-318 for the scene 320. As is illustrated in FIG. 3, the user interface 300 presents a number of elements or objects of scene 320 that could be obscured from the view point of a user who is consuming the corresponding content stream if a content provider were to place an overlay UI element in the same position as an existing element or object. For example, a content provider may wish to place an overlay UI element that corresponds to their web camera feed over container 316 which includes the player's avatar and ammunition. In accordance with at least one embodiment, the service provider computer may associate one or more tags with each container or area of containers or areas 304-318 based on input from users. For example, user input may associate a tag of "player weapons" with container 306, "chat messages" with container 314, and "round time and score" with container 310. In embodiments, the tags associated with container or areas 304-318 may be used when determining prominence values for the containers or areas 304-318.

Figure 4:
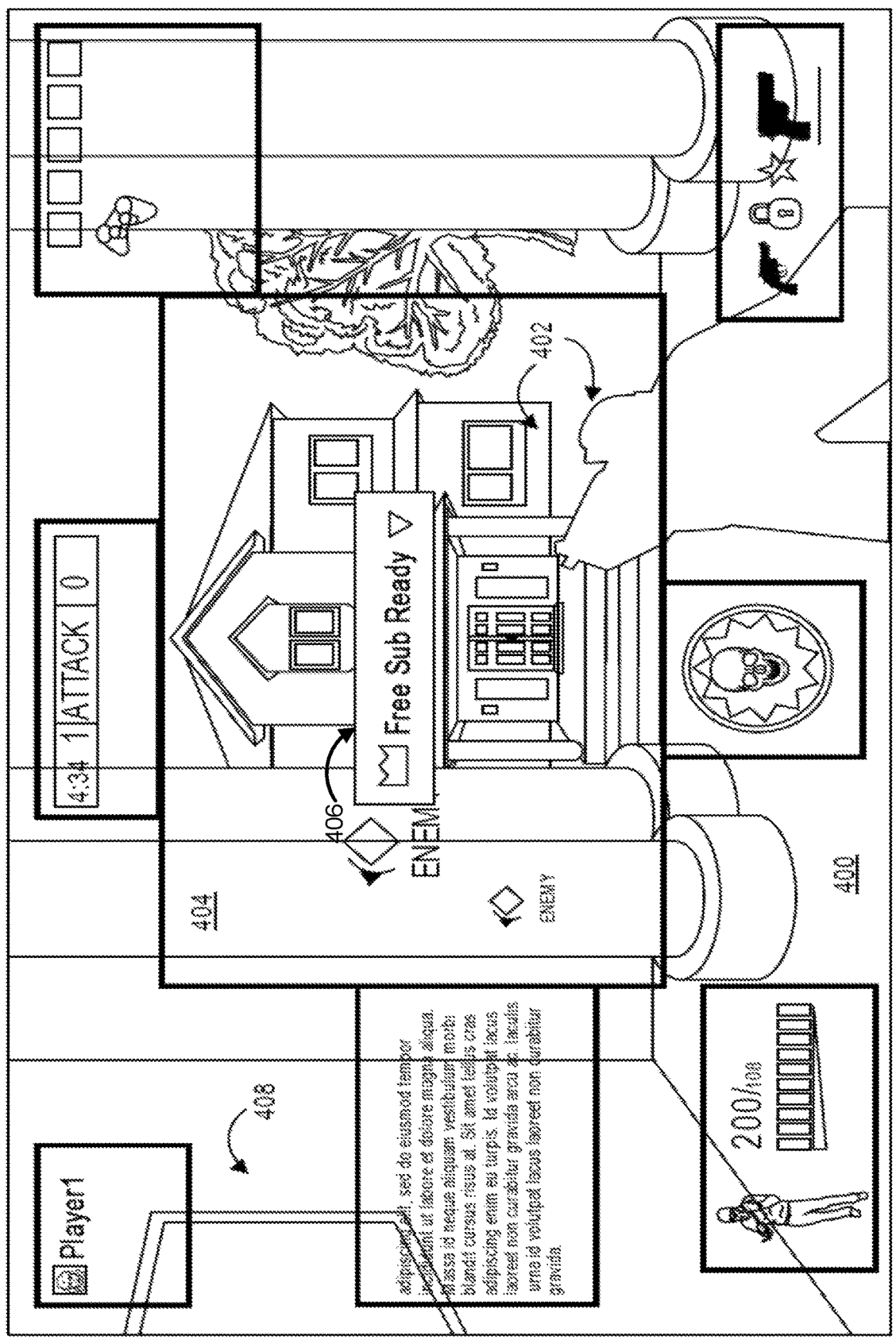
FIG. 4 illustrates an example error case of a placement of an overlay user interface element on a user interface, in accordance with at least one embodiment.

FIG. 4 illustrates an example error case of a placement of an overlay user interface element on a user interface, in accordance with at least one embodiment. FIG. 4 includes user interface 400 presenting content of a scene 402 within at least container or area 404. The user interface 400 depicts an error case where a user, such as a content provider playing the video game presented in user interface 400, has placed or provided input which places overlay UI element 406 in a primary portion of the user interface 400 (e.g., center of the user interface 400) which covers or obscures content that a viewing user would rather see than be obscured from seeing. By placing overlay UI element 406 in the depicted position or configuration a viewing user who consumes the content stream associated with the scene 402 may be blocked or obscured from viewing pivotal content provided by the content provider. As depicted in FIG. 4, the overlay UI element 406 corresponds to a subscription UI element that may be configured to subscribe a user to follow the player that is playing content corresponding to scene 402. In an ideal situation, the content provider would place overlay UI element 406 at position 408 to avoid obscuring any of the UI elements presented in user interface 400.

Figure 5:
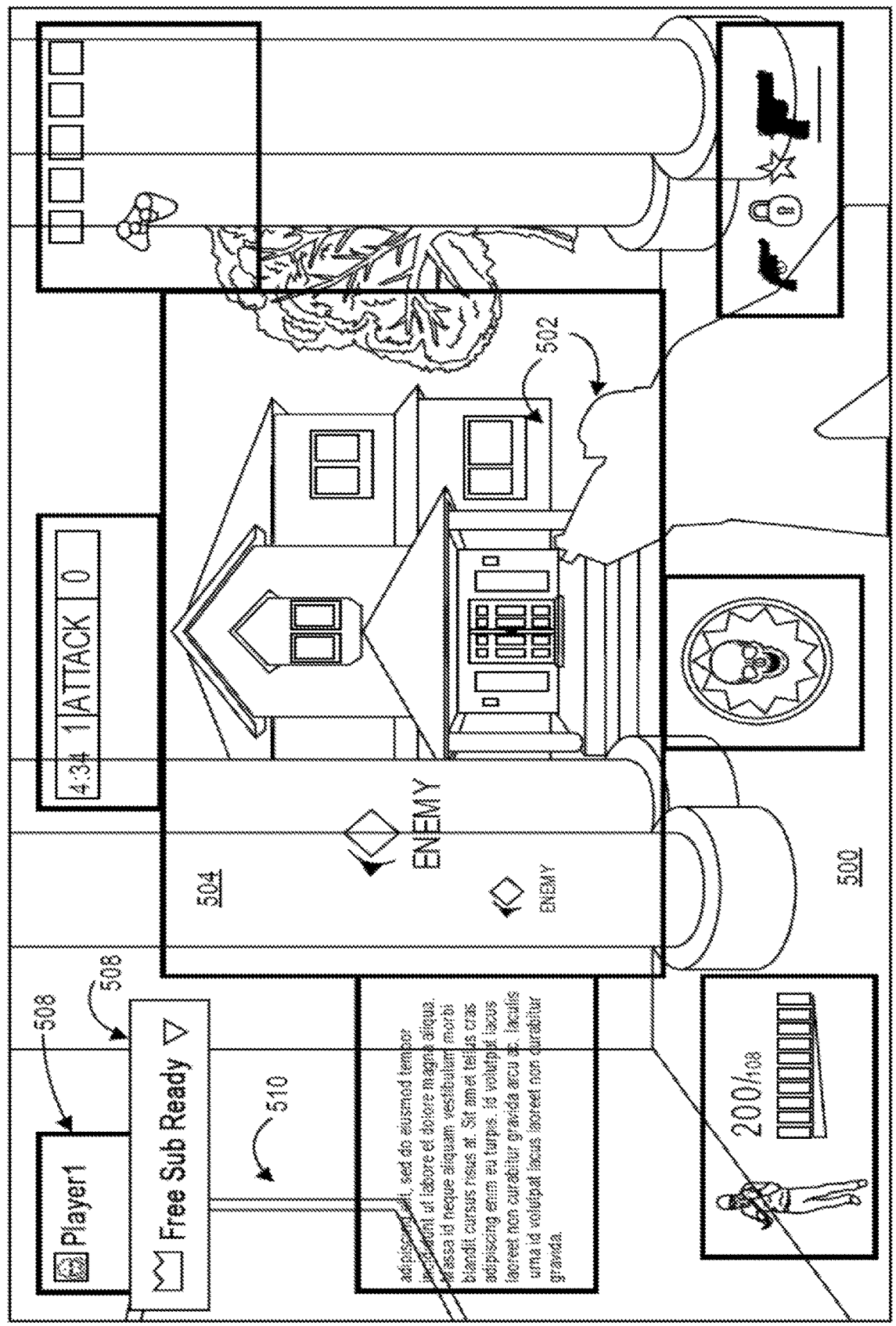
FIG. 5 illustrates an example error case of a placement of an overlay user interface element on a user interface, in accordance with at least one embodiment.

FIG. 5 illustrates an example error case of a placement of an overlay user interface element on a user interface, in accordance with at least one embodiment. FIG. 5 includes user interface 500 presenting content of a scene 502 within at least containers or areas 504 and 506. The user interface 500 depicts an error case where a user, such as a content provider playing the video game presented in user interface 500, has placed or provided input which places overlay UI element 508 in a position that partially covers or obscures the content presented via area or container 506. As depicted in FIG. 5, the overlay UI element 508 has boundaries or content that intersects with and partially obscures the content included in area or container 506. A viewing user who consumes the content presented via user interface 500 may find this partial coverage annoying or distracting when viewing the content. In an idea situation, the content provider would place overlay UI element 508 at position 510 to avoid intersecting and partially obscuring area or container 506.

Figure 6:
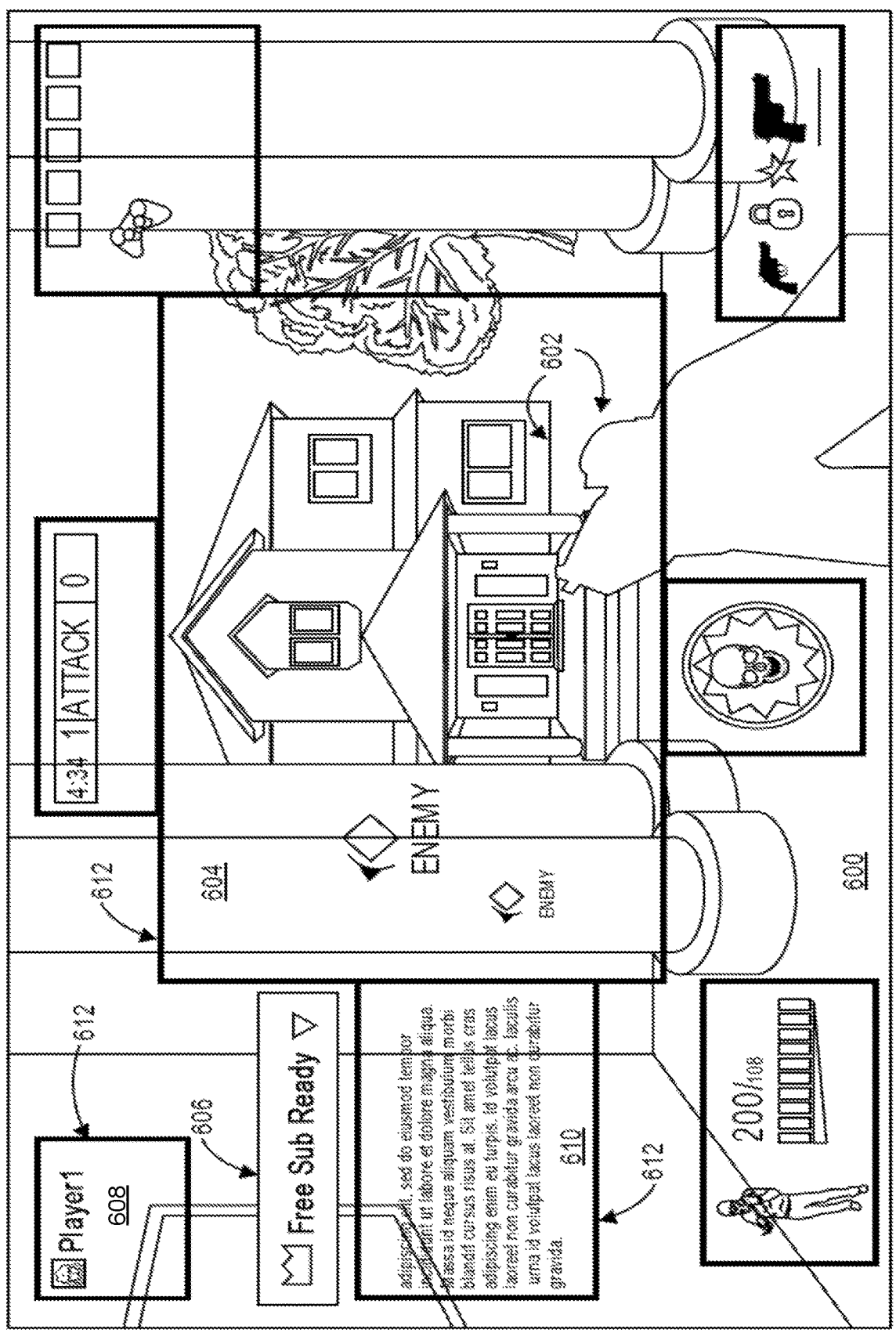
FIG. 6 illustrates an example user interface implementing an overlay modification feature, in accordance with at least one embodiment.

FIG. 6 illustrates an example user interface implementing an overlay modification feature, in accordance with at least one embodiment. FIG. 6 includes user interface 600 presenting content of a scene 602 in at least container 604 as well as successful placement of overlay UI element 606 in a position that avoids obscuring content presented via user interface 600 (e.g., areas or containers 608 and 610) or intersecting with nearby containers or areas 604, 608, and 610. In accordance with at least one embodiment, the overlay modification feature may visually or graphically represent boundaries (612) of containers 604, 608, and 610 to enable a content provider playing the video game presented in user interface 600 to place overlay UI element 606 in a position or size the overlay UI element 606 to avoid intersecting nearby areas or containers (604, 608, and 610) or obscuring nearby areas or containers (604, 608, and 610). Unlike the user interfaces 400 or 500 depicted in FIGS. 4 and 5, the overlay UI element 606 is not placed directly within a defined container or area such as 604 so that it wholly obscures content presented within the container or area, nor does overlay UI element 606 partially obscure content presented within the container or area such as 608 by intersecting boundaries of the overlay UI element 606 with boundary 612 of container or area 608.

Figure 7:
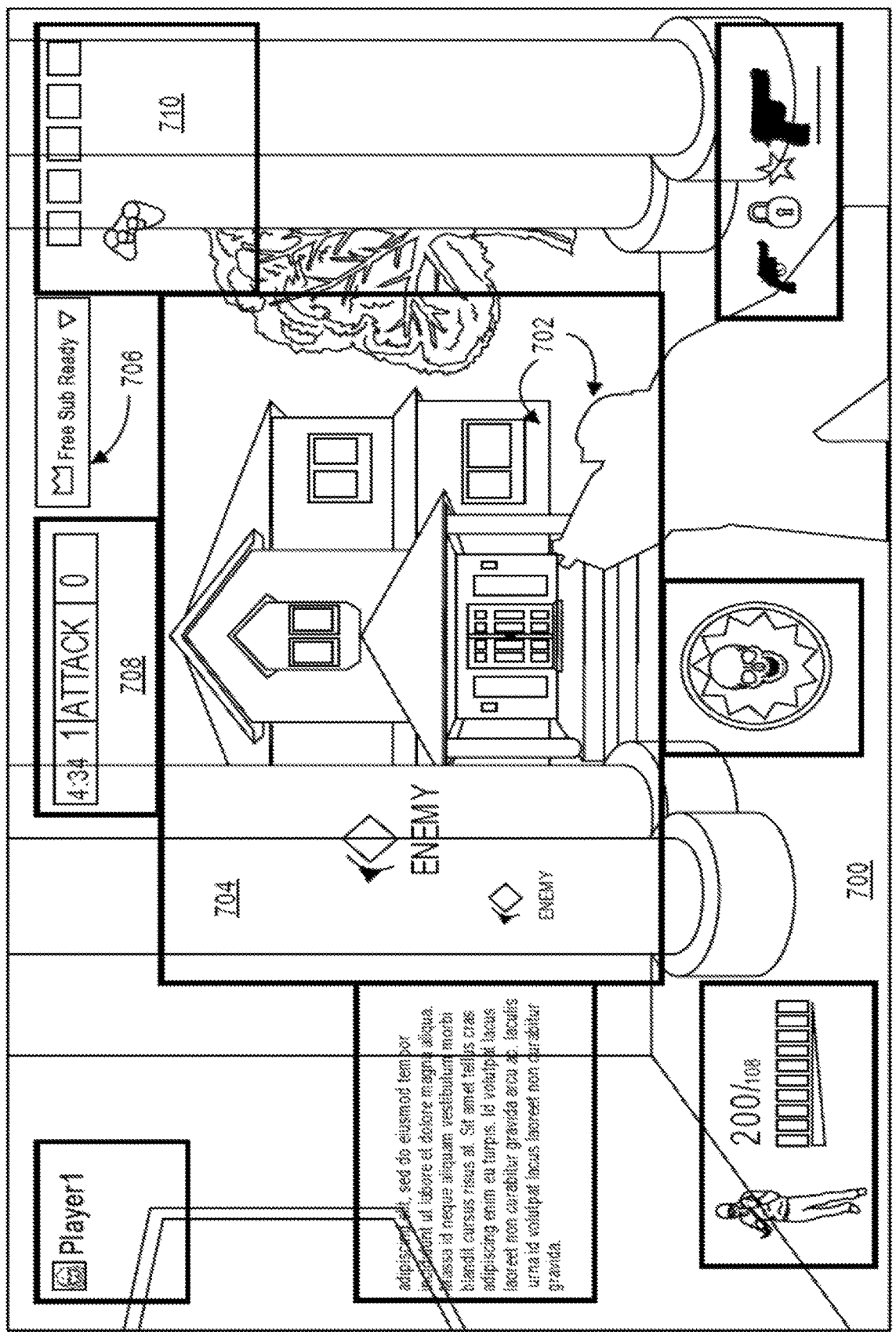
FIG. 7 illustrates an example user interface implementing an overlay modification feature, in accordance with at least one embodiment.

FIG. 7 illustrates an example user interface implementing an overlay modification feature, in accordance with at least one embodiment. The user interface 700 depicted in FIG. 7 illustrates another successful placement of an overlay UI element via the overlay modification features described herein. In FIG. 7, the user interface 700 presents content of a scene 702 in at least container 704 as well as an overlay UI element 706 that has been resized or reduced in quality to fit within containers 708 and 710. In embodiments, the overlay modification feature implemented by the service provider computers may remove portions of an overlay UI element, reduce the size of the overlay UI element, or reduce the quality of the overlay UI element to place the overlay UI element (e.g., 706) within the user interface 700 and avoid obscuring or intersecting with other containers in the approximate area (e.g., 708 and 710). For example, the overlay UI element 706 may be a to scale example of overlay UI element 606 from FIG. 6. The original size of overlay UI element 606 would not fit within the space between containers or areas 708 and 710 of FIG. 7. In embodiments, the overlay UI element 706 is reduced in size so that placement of the overlay UI element 706 may be accomplished within user interface 700 without obscuring the content included in containers 708 and 710.

Figure 8:
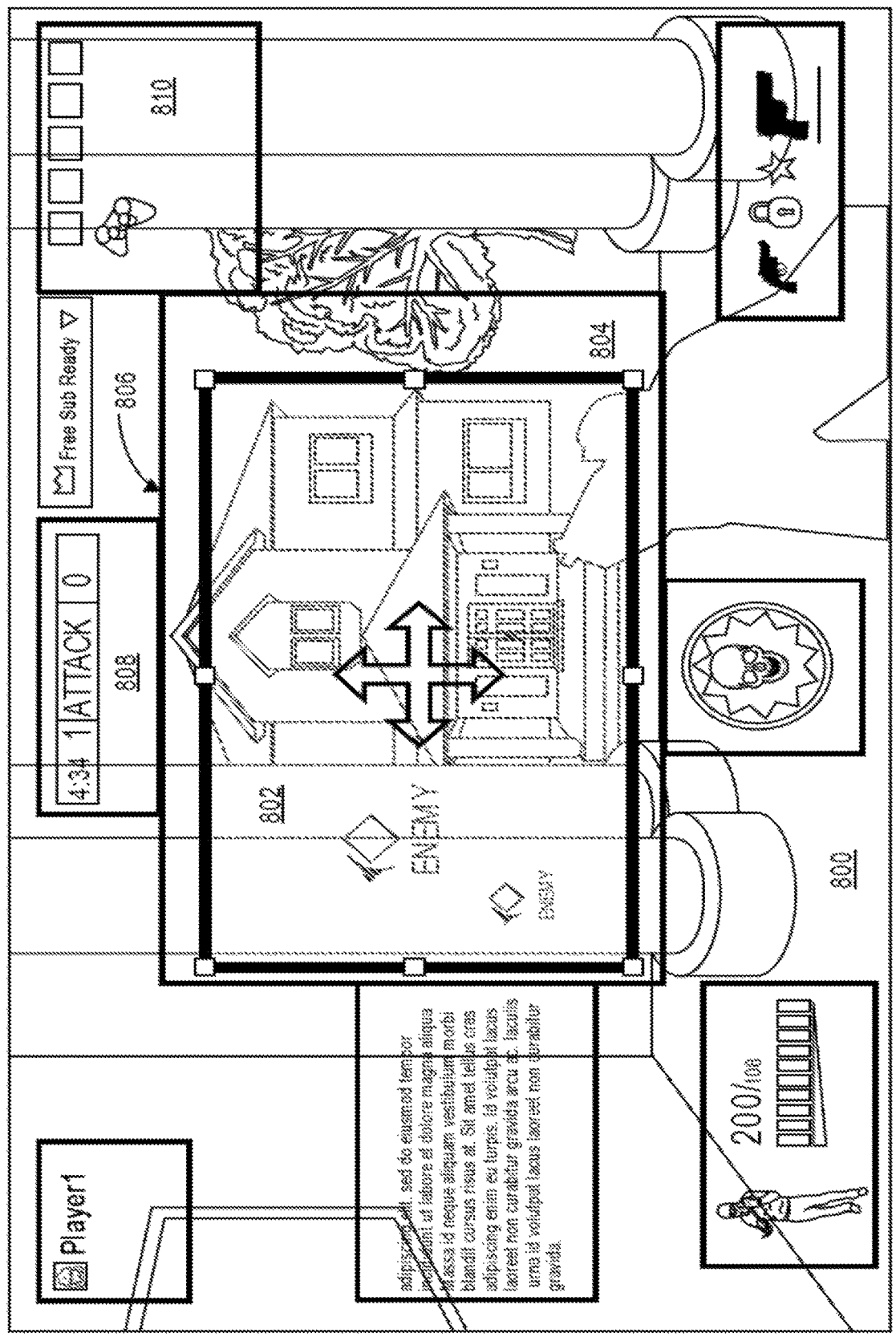
FIG. 8 illustrates an example user interface with a boundary creation tool for an overlay modification feature, in accordance with at least one embodiment.

FIG. 8 illustrates an example user interface with a boundary creation tool for an overlay modification feature, in accordance with at least one embodiment. In embodiments, the overlay modification feature implemented by the service provider computers may receive input from users to adjust boundaries, sizes, or positions of containers for areas of a user interface such as user interface 800. As depicted in FIG. 8, a UI element 802 may be presented to a user which they may interact with, via input/output devices, to adjust the size, boundaries or positions of container or area 804. In accordance with at least one embodiment, boundary 806 and the size and position of container or area 804 may be determined based on utilizing a data structure which defines the boundary, size, and position, computer vision techniques which define the previously described attributes, or information requested from an application via an API call that defines the previously described attributes. In embodiments, user input may be used to adjust or correct the boundary 806 or size and position of container 804 which may require slight correction after utilizing any of the previously described methods to define the boundaries, size, and position of containers for an overlay of a scene. In accordance with at least one embodiment, the service provider computers may prohibit a user from providing input which would result in the boundary 806 from intersecting or obscuring containers 808 and 810 or any other approximately close containers or areas defined in the overlay of user interface 800. In embodiments, the service provider computers may utilize prominence values of containers 804, 808, and 810 to adjust or prohibit redefining boundaries, sizes, or position of container 804 within user interface. For example, container 804 may have the highest prominence value of the containers illustrated in FIG. 8. In such a case, the service provider computers may allow movement of the container 804 to obscure any other portion or whole of a container (e.g., 810) within user interface 800 and the corresponding prominence value being less than the prominence value for container 804. In some embodiments, the service provider computers may utilize thresholds which indicate a series of rules that enable or prohibit the movement or changing of size of a container in the user interface 800 that would result in obscuring or intersecting with other containers of the user interface 800.

Figure 9:
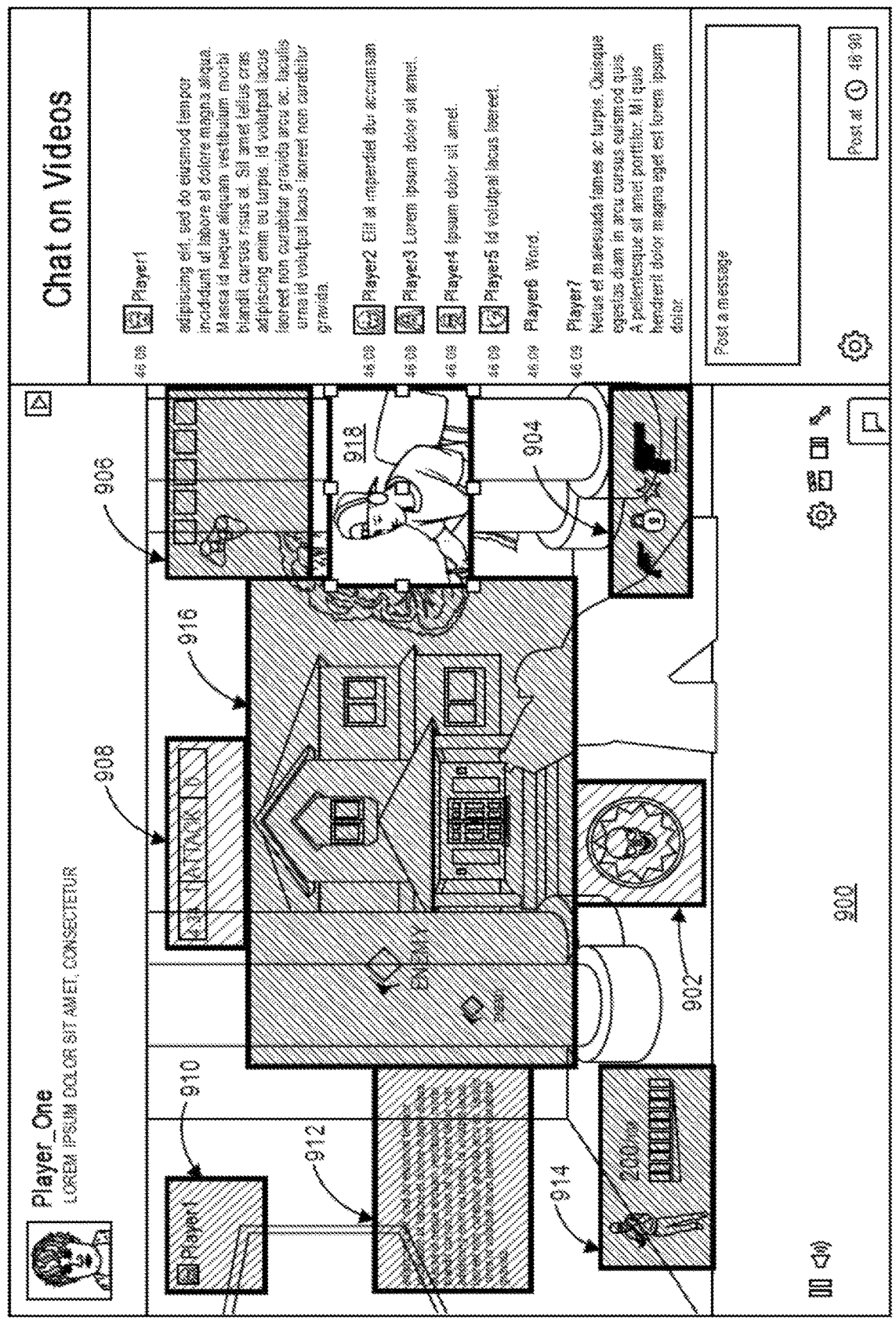
FIG. 9 illustrates an example user interface implementing an overlay modification feature, in accordance with at least one embodiment.

FIG. 9 illustrates an example user interface implementing an overlay modification feature, in accordance with at least one embodiment. The user interface 900 of FIG. 9 illustrates a visual representation of boundaries, locations, and sizes for containers or areas 902-916 but also gradients (depicted as various line patterns in FIG. 9) that coincide with associated prominence values for the corresponding containers or areas 902-916. In embodiments, the user interface 900 and incorporated overlay may visually or graphically represent or indicate prominence values for containers or areas 902-916 to aid a user in identifying areas or containers within the user interface 900 that would be appropriate or not as dissuading for viewers who consume the content presented via user interface 900. In embodiments, the visual or graphical representation of the prominence values may follow a color scheme such as a green for appropriate and red for inappropriate prominence values associated with containers or areas 902-916. In embodiments, the visual or graphical representation of the prominence values may follow a fill gradient, as illustrated in FIG. 9, that represents the associated prominence values for containers or areas 902-916. The visual or graphical representation may include any suitable indicator that communicates a gradient of appropriate to inappropriate areas for placing overlay UI elements including a gradient fill, colors, or text warnings. As depicted in FIG. 9, the overlay UI element 918 is placed in an area of the user interface 900 such that it partially intersects with container 916 which may have a prominence value which allows a minor obscuring caused by the placement of overlay UI element 918 according to a policy or rule implemented by the service provider computers. In embodiments, the service provider computers may resize the overlay UI element 918 so that it does not intersect with the boundary for container 916.

Figure 10:
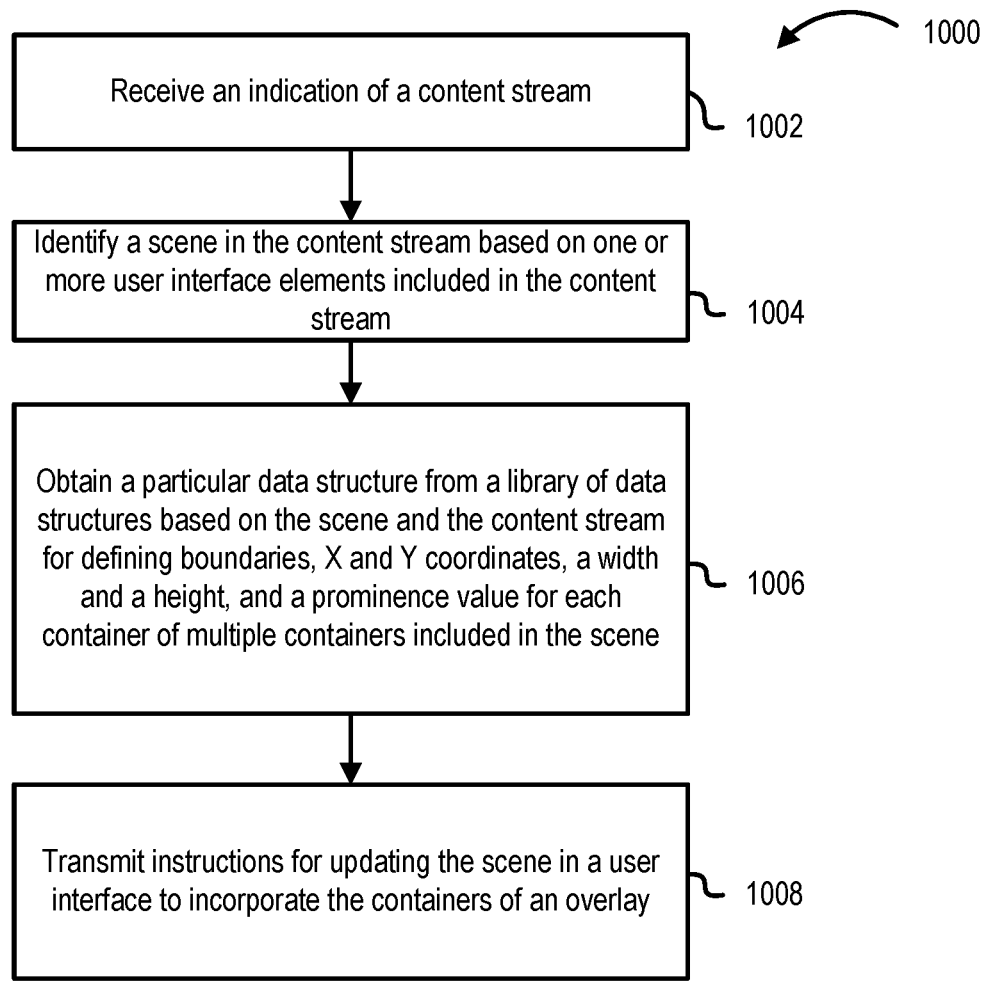
FIG. 10 illustrates an example flow chart for an overlay modification feature, in accordance with at least one embodiment.
Figure 11:
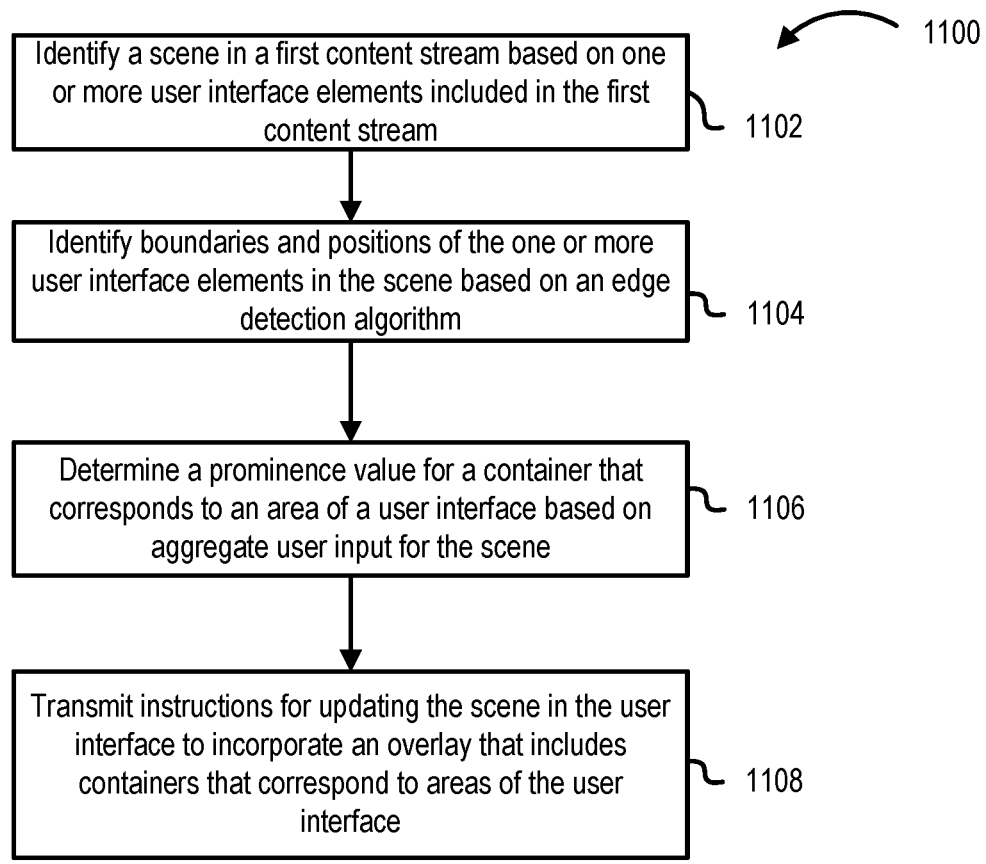
FIG. 11 illustrates an example flow chart for an overlay modification feature, in accordance with at least one embodiment.
Figure 12:
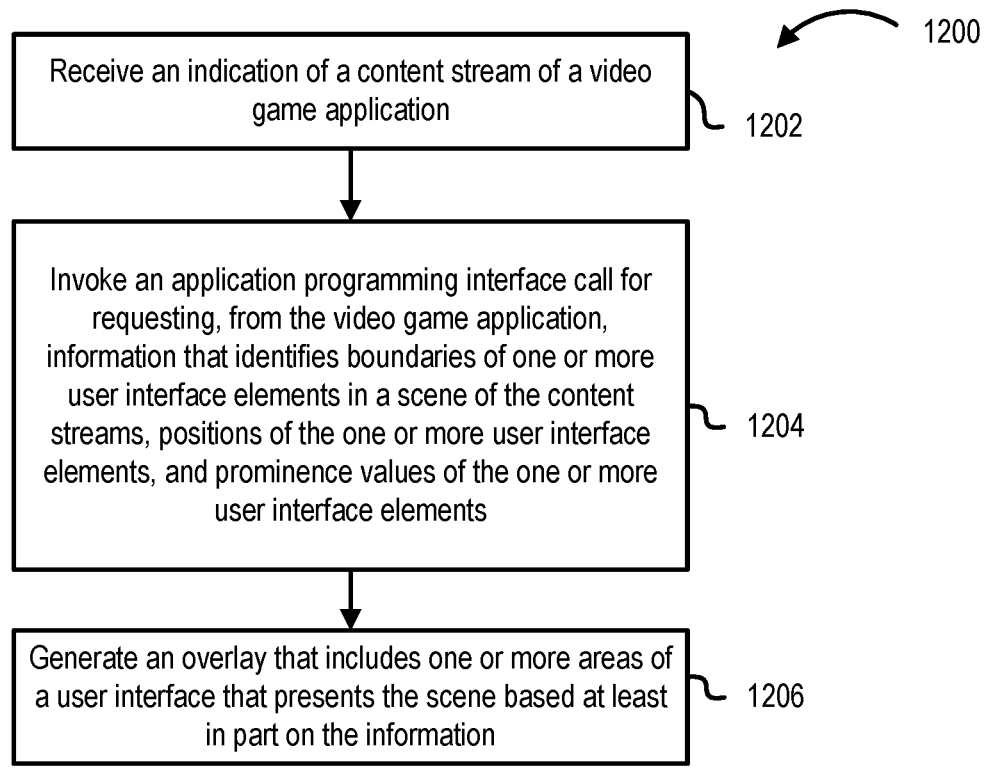
FIG. 12 illustrates an example flow chart for an overlay modification feature, in accordance with at least one embodiment.

FIGS. 10-12 illustrate example flow charts for an overlay modification feature, according to embodiments. These processes are illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer executable instructions include routines, programs objects, components, data structures, and the like that perform particular functions or implement particular data types. The order in which the operations are described is not intended to be construed as a limitation, and any number of the described operations can be combined in any order and/or in parallel to implement the process.

Additionally, some, any, or all of the processes (or any other processes described herein, or variations and/or combination thereof) may be performed under the control of one or more computer systems configured with executable instructions and may be implemented as code (e.g., executable instructions, one or more computer programs, or one or more applications) executing collectively on one or more processors, by hardware or combinations thereof. As noted above, the code may be stored on a computer-readable storage medium, for example, in the form of a computer program including a plurality of instructions executable by one or more processors. The computer-readable storage medium may be non-transitory.

Figure 15:
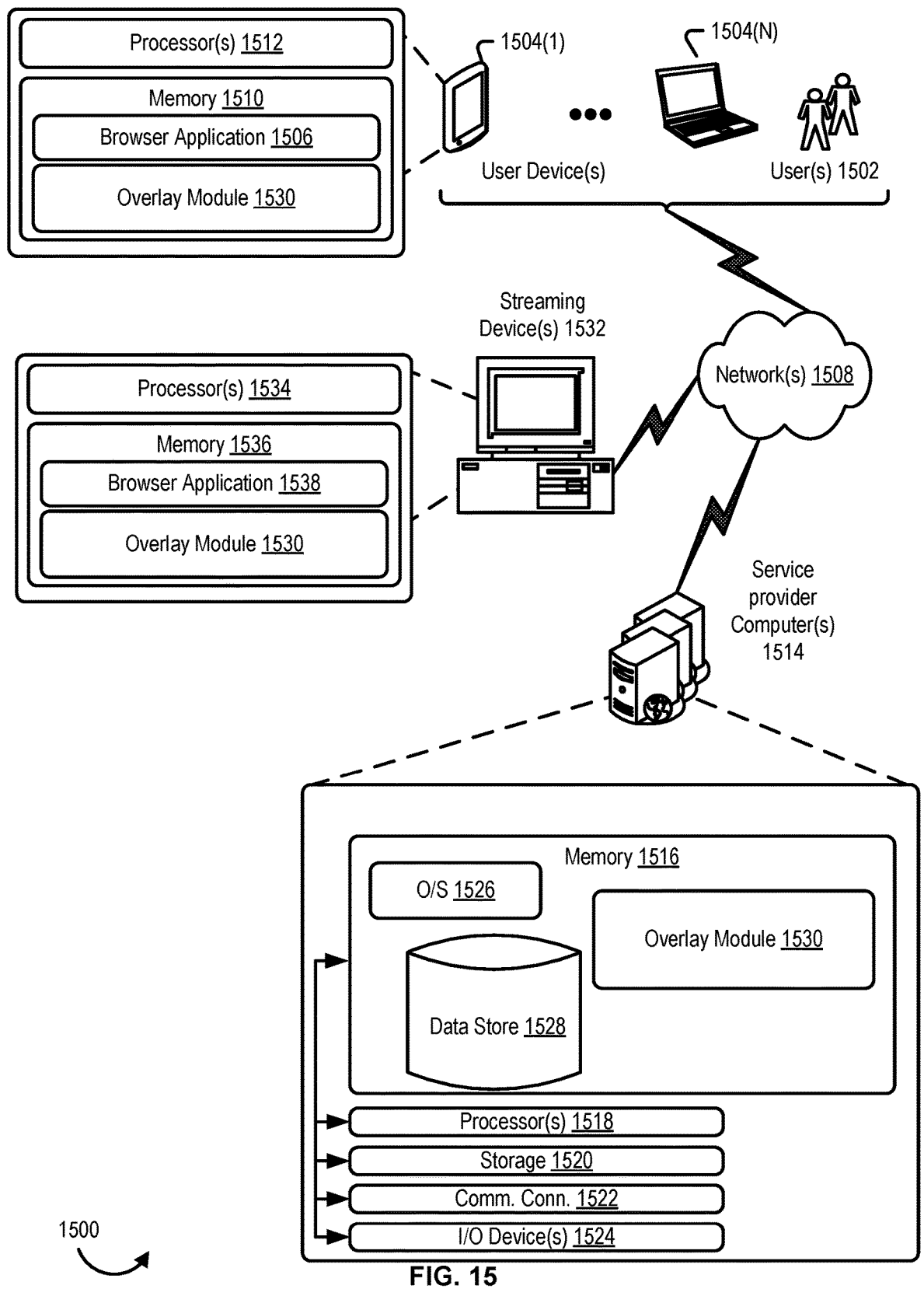
FIG. 15 illustrates an example architecture for implementing an overlay modification feature, in accordance with at least one embodiment.

In some examples, the service provider computers (service provider computers 108) utilizing at least the overlay module 1530 depicted in FIG. 15 may perform the processes 1000, 1100, and 1200 of FIGS. 10-12. In FIG. 10, the process 1000 may include receiving an indication of a content stream at 1002. In embodiments, the indication may be received by the service provider computers from a content streaming computer. The process 1000 may include identifying a scene in the content stream based on one or more user interface elements included in the content stream at 1004. In embodiments the service provider computers may map certain user interface elements to certain scenes of a piece of content such as UI elements associated with a particular video game or software application.

The process 1000 may include obtaining a particular data structure from a library of data structures based on the scene and the content stream for defining boundaries, X and Y coordinates, a width and a height, and a prominence value for each container of multiple containers included in the scene at 1006. In embodiments, a configuration of the one or more containers of the overlay for the scene and the prominence values for the one or more containers may be based on user input. For example, the content provider may provide input which specifies prominence values for each container or area of a scene for a piece of content such as a particular UI arrangement of UI elements in a video game. In embodiments, the library of data structures may include a plurality of data structures that correspond to multiple scenes of a piece of content. For example, the library may include a plurality of data structures that are associated with a particular video game and cover with all the different scenes that are presented by a user interface when a user plays the video game. The process 1000 may include transmitting instructions for updating the scene in a user interface to incorporate the containers of an overlay at 1008. In accordance with at least one embodiment, the configuration of the containers of the overlay enables a user to place or provide input that places an overlay user interface element in a container of the one or more containers based at least in part on an associated prominence value for the container. For example, if a user attempts to place an overlay UI element that includes a web-cam feed of themselves over the relative center of the user interface presenting the content, the system may provide feedback which informs the user that this is an incorrect placement of the overlay UI element as the area that corresponds to the center of the UI is associated with a high prominence value (e.g., includes a portion of the UI for the scene that a user would most likely want to view if viewing the content).

In accordance with at least one embodiment, the overlay may present or visually represent prominence values that are associated with various areas of the UI or containers of the UI using a gradient color system. For example, portions of the UI that have low prominence values may be represented with the color green where the brighter the green color is for an area representing the lower prominence value and thereby associated with an appropriate place to put overlay UI elements. A red color may be associated with high prominence values where the brighter red color for an area representing a higher prominence value and thereby not associated with an appropriate place to put overlay UI elements. In accordance with at least one embodiment, incorporating the overlay into the scene may include visually representing the boundaries and size associated with the containers or areas of the UI presenting the scene to aid a user in placing overlay UI elements.

The process 1100 of FIG. 11 includes identifying a scene in a first content stream based on one or more user interface elements included in the first content stream at 1102. The process 1100 includes identifying boundaries and positions of the one or more user interface elements in the scene based on an edge detection algorithm at 1104. In embodiments, the service provider computers may utilize edge detection algorithms such as Marr-Hilderth LoG, Canny, and Shen Castan algorithms. The process 1100 may include determining a prominence value for a container that corresponds to an area of a user interface based on aggregate user input for the scene at 1106. In embodiments, the service provider computers may aggregate input from users who have interacted with a user interface presenting the UI elements for the scene and provided prominence values for the various areas of the UI for the scene. The process 1100 may include transmitting instructions for updating the scene in the user interface to incorporate an overlay that includes containers that correspond to areas of the user interface at 1108. In accordance with at least one embodiment, the overlay may enable a user to provide input to place an overlay user interface element in a particular container based at least in part on the prominence value for the particular container. In accordance with at least one embodiment, the service provider computer may utilize one or more thresholds to identify when a container can be covered with an overlay UI element. For example, one threshold may indicate that prominence values of a certain value (e.g., 8 or above) can never be covered by overlay UI elements.

In embodiments, the service provider computers may be configured to associate one or more tags with containers or areas of a scene based on user input. The service provider computers may utilize the tags and preferences of viewing users to generate a prominence value for an area or container of a UI presenting a scene. For example, a user may tag certain portions of a scene as "player information" for a video game and indicate that they prefer to view all player information when consuming video game streaming content. A service provider computer implementing the overlay modification feature described herein may utilize the tag input and the preferences to generate a high prominence value for areas that are associated with "player information" as the content switches from scene to scene or presents a static scene. In accordance with at least one embodiment, the overlay modification feature implemented by the service provider computers includes resizing or reducing the quality of an overlay UI element to fit into a container or area that has been generated or defined in the overlay. For example, a web-cam feed of a video game streamer may be reduced in resolution or quality and the pixel size of the web-came feed may be reduced to fit within a container that has an appropriate prominence value (e.g., has a prominence value that indicates that an overlay UI element may obscure streaming content from a viewer's perspective). In embodiments, the service provider computers may remove certain portions of an overlay UI element to fit within the boundaries of a container or area defined by the UI and avoid violating the prominence values of nearby containers or areas of the UI for the scene. In embodiments, specifications for different types of content may be utilized to remove portions of an overlay UI element or truncate the overlay UI element. For example, a certain specification may indicate that normally a title, subtitle, paragraph, and image may be supported by a container or area of the UI but if it needs to be truncated to avoid violating prominence values, the subtitle and image may be removed.

The process 1200 may include receiving an indication of a content stream of a video game application at 1202. The process 1200 may include invoking an API call for requesting, from the video game application, information that identifies boundaries of one or more user interface elements in a scene of the content streams, positions of the one or more UI elements, and prominence values of the one or more UI elements at 1204. In accordance with at least one embodiment, each video game application may provide, upon request by an API call from the service provider computer, information about presented UI elements in a scene such as the positions, boundaries, and prominence values for the UI elements as specified by the developer of the video game application. The process 1200 may include generating an overlay that includes one or more areas of a user interface that presents the scene based at least in part on the information. In embodiments, the overlay may be configured to enable a user to provide input which places, incorporates, or otherwise inserts an overlay UI element in an area of the one or more areas of the UI for the scene in the content based at least in part on the information provided in response to the API call to the video game application.

In accordance with at least one embodiment, the overlay may be configured to generate and present a visual representation of the boundaries and size of a container that a user is attempting to fit an overlay UI element into but that doesn't fit into the container (e.g., the size of the overlay UI element is greater than the size of the container) or violates a high prominence value associated with the container. In embodiments, the overlay may provide a preview presentation that visually represents all the containers of a scene in the UI with associated boundaries, sizes, positions, and relevancy values for a user to view prior to placing overlay content. In embodiments, a content provider may attempt to change the boundaries or size of a particular container based on its associated prominence value of the container being interacted with and the surrounding container's prominence values that intersect with the proposed position or size change. In embodiments, the service provider computer may update prominence values for one or more containers based on aggregate input from users who are consuming the streaming content which may be different than the prominence values obtained via the video game application.

Figure 13:
FIG. 13 illustrates an example user interface implementing an overlay modification feature, in accordance with at least one embodiment.

FIG. 13 illustrates an example user interface implementing an overlay modification feature, in accordance with at least one embodiment. FIG. 13 includes a user interface 1300 presenting a stream of content that includes a broadcast associated with a store or show such as the cooking show 1302. The user interface 1300 includes one or more visual elements such as labels 1304 for products and the products themselves 1306 (e.g., cheese blocks). The user interface 1300 may include one or more overlay UI elements such as overlay UI element 1308 and 1310. In embodiments, the overlay UI elements 1308 and 1310 may be positioned and presented within certain boundaries of areas or containers associated with the content stream presented via user interface 1300 according to the overlay modification features described herein. For example, overlay UI element 1310 may include a separate web camera feed of a user device that a person associated with the cooking show 1302 is interacting with during the content stream. As described herein, the overlay modification feature can identify placement and configuration for overlay UI elements for streams of content that include visual elements that are included in the content stream such as the labels 1304 or products 1306 of the content stream presented in user interface 1300. In embodiments, the service provider computer implementing the overlay modification features described herein can analyze content streams to identify visual elements 1312 (e.g., the microwave) that remain in a fixed position during a series of frames for use in determining the boundaries, positions, and relevancy values for corresponding areas or containers of the content stream that include the visual elements 1312. FIG. 13 depicts overlay UI elements 1308 and 1310 being placed and presented in user interface 1300 in a configuration and positions with respect to the static visual elements 1302, 1304, 1306, and 1312 to avoid intersecting with other areas or containers of the interface and obscure content from being viewed by a consuming user or content viewing user.

Figure 14:
FIG. 14 illustrates an example user interface implementing an overlay modification feature, in accordance with at least one embodiment.

FIG. 14 illustrates an example user interface implementing an overlay modification feature, in accordance with at least one embodiment. FIG. 14 includes a user interface 1400 presenting a stream of content that includes a broadcast associated with a store or show such as the cooking show 1402. The user interface 1400 includes one or more visual elements such as labels 1404 for products and the products themselves 1406 (e.g., cheese blocks). The user interface 1400 may include one or more overlay UI elements such as overlay UI element 1408 and 1410. The overlay UI element 1410 may correspond to a web camera feed that presents a user associated with the show 1402 interacting with a product 1406. In embodiments, the overlay UI elements 1408 and 1410 may be positioned and presented within certain boundaries of areas or containers associated with the content stream presented via user interface 1400 according to the overlay modification features described herein. An initial configuration of overlay UI elements 1408 and 1410 may be updated based on input received from a user device associated with a content viewing user. For example, the service provider computers implementing the overlay modification feature may receive input from a user, via a user device, to modify the position, size, and configuration of the overlay UI elements 1408 and 1410.

The service provider computers may modify the overlay for the content stream presented via user interface 1400 for the user device that provided the input based at least in part on the prominence values associated with containers or areas that correspond to the new positions, sizes, and configurations for overlay UI elements 1408 and 1410. In embodiments, the overlay UI elements 1408 and 1410 may be tethered or fixed to certain visual elements included in a scene for the content stream presented via user interface 1400. For example, overlay UI element 1410 may be tethered to visual element 1406 such that the position and size of the overlay UI element 1410 is fixed within a certain pixel distance and size that corresponds to the visual element 1406. In embodiments, a threshold may be maintained by the service provider computers and specified by users which indicates a speed or rate at which overlay UI elements, such as overlay UI elements 1408 and 1410, are dynamically positioned and resized as a scene changes in a content stream or based in input provided by the broadcaster associated with the stream or user input provided by a content viewing user.

FIG. 15 illustrates an example architecture for implementing an overlay modification feature, in accordance with at least one embodiment. In architecture 1500, one or more users 1502 (e.g., content viewers) may utilize user computing devices 1504(1)-(N) (collectively, user devices 1504) to access a browser application 1506 or a user interface (UI) accessible through the browser application 1506, via one or more networks 1508 to interact or consume content streams from one or more streaming devices 1532 and/or interact with a user interface presenting the content stream with an overlay according to the overlay modification features disclosed herein. In embodiments, the one or more users 1502 may utilize user computing devices 1504(1)-(N) to access the browser application 1506 or a UI accessible through the browser application 1506, via one or more networks 1508, to request content from a streaming device 1532 via service provider computers 1514. The "browser application" 1506 can be any browser control or native application that can access and display a network page or other information such as a user interface of a native software application for enabling interaction and consumption of a content stream provided by a content provider as disclosed herein. A native software application may include an application or program that has been developed for use on a particular platform (such as an operating system) or a particular device (such as a particular type of mobile device or user device 1504). In embodiments, the user device 1504 may include one or more components for enabling the user 1502 to interact with the browser application 1506 such as input/output devices, monitors, speakers, microphones, etc.

The user devices 1504 may include at least one memory 1510 and one or more processing units or processor(s) 1512. The memory 1510 may store program instructions that are loadable and executable on the processor(s) 1512, as well as data generated during the execution of these programs. Depending on the configuration and type of the user devices 1504, the memory 1510 may be volatile (such as random access memory (RAM)) and/or non-volatile (such as read-only memory (ROM), flash memory, etc.). The user devices 1504 may also include additional removable storage and/or non-removable storage including, but not limited to, magnetic storage, optical disks, and/or tape storage. The disk drives and their associated non-transitory computer-readable media may provide non-volatile storage of computer-readable instructions, data structures, program modules, and other data for the user devices 1504. In some implementations, the memory 1510 may include multiple different types of memory, such as static random access memory (SRAM), dynamic random access memory (DRAM), or ROM.

Turning to the contents of the memory 1510 in more detail, the memory 1510 may include an operating system and one or more application programs or services for implementing the features disclosed herein. Additionally, the memory 1510 may include one or more modules for implementing the features described herein including the overlay module 1530.

The architecture 1500 may also include one or more service provider computers 1514 that may, in some examples, provide computing resources such as, but not limited to, client entities, low latency data storage, durable data store, data access, management, virtualization, hosted computing environment or "cloud-based" solutions, electronic content performance management, media streaming services, content generation, etc. The service provider computers 1514 may implement or be an example of the service provider computer(s) described herein with reference to FIGS. 1-14 and throughout the disclosure. The one or more service provider computers 1514 may also be operable to provide site hosting, media streaming services, computer application development, and/or implementation platforms, combinations of the foregoing, or the like to the one or more users 1502 via user devices 1504.

In some examples, the networks 1508 may include any one or a combination of many different types of networks, such as cable networks, the Internet, wireless networks, cellular networks, and other private and/or public networks. While the illustrated examples represent the users 1502 and streaming device 1532 communicating with the service provider computers 1514 over the networks 1508, the described techniques may equally apply in instances where the users 1502 or streaming devices 1532 interact with the one or more service provider computers 1514 via the one or more user devices 1504 or streaming devices 1532 over a landline phone, via a kiosk, or in any other manner. It is also noted that the described techniques may apply in other client/server arrangements (e.g., set-top boxes, etc.), as well as in non-client/server arrangements (e.g., locally stored applications, peer-to-peer arrangements, etc.).

The one or more service provider computers 1514 may be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the one or more service provider computers 1514 may be executed by one or more virtual machines implemented in a hosted computing environment. The hosted computing environment may include one or more rapidly provisioned and released computing resources, which computing resources may include computing, networking, and/or storage devices. A hosted computing environment may also be referred to as a cloud computing environment or distributed computing environment. In some examples, the one or more service provider computers 1514 may be in communication with the user device 1504 via the networks 1508, or via other network connections. The one or more service provider computers 1514 may include one or more servers, perhaps arranged in a cluster or as individual servers not associated with one another.

In one illustrative configuration, the one or more service provider computers 1514 may include at least one memory 1516 and one or more processing units or processor(s) 1518. The processor(s) 1518 may be implemented as appropriate in hardware, computer-executable instructions, firmware, or combination thereof. Computer-executable instruction or firmware implementations of the processor(s) 1518 may include computer-executable or machine-executable instructions written in any suitable programming language to perform the various functions described when executed by a hardware computing device, such as a processor. The memory 1516 may store program instructions that are loadable and executable on the processor(s) 1518, as well as data generated during the execution of these programs. Depending on the configuration and type of the one or more service provider computers 1514, the memory 1516 may be volatile (such as RAM) and/or non-volatile (such as ROM, flash memory, etc.). The one or more service provider computers 1514 or servers may also include additional storage 1520, which may include removable storage and/or non-removable storage. The additional storage 1520 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 1516 may include multiple different types of memory, such as SRAM, DRAM, or ROM.

The memory 1516, the additional storage 1520, both removable and non-removable, are all examples of non-transitory computer-readable storage media. For example, computer-readable storage media may include volatile or non-volatile, removable or non-removable media implemented in any method or technology for storage of information such as computer-readable instructions, data structures, program modules, or other data. The memory 1516 and the additional storage 1520 are all examples of non-transitory computer storage media. Additional types of non-transitory computer storage media that may be present in the one or more service provider computers 1514 may include, but are not limited to, PRAM, SRAM, DRAM, RAM, ROM, EEPROM, flash memory or other memory technology, CD-ROM, DVD, or other optical storage, magnetic cassettes, magnetic tape, magnetic disk storage or other magnetic storage devices, or any other medium which can be used to store the desired information and which can be accessed by the one or more service provider computers 1514. Combinations of any of the above should also be included within the scope of non-transitory computer-readable media.

The one or more service provider computers 1514 may also contain communication connection interface(s) 1522 that allow the one or more service provider computers 1514 to communicate with a data store, another computing device or server, user terminals, and/or other devices on the networks 1508. The one or more service provider computers 1514 may also include I/O device(s) 1524, such as a keyboard, a mouse, a pen, a voice input device, a touch input device, a display, speakers, a printer, etc.

Turning to the contents of the memory 1516 in more detail, the memory 1516 may include an operating system 1526, one or more data stores 1528, and/or one or more application programs or services for implementing the features disclosed herein including the overlay module 1530. In accordance with at least one embodiment, the overlay module 1530 may be configured to at least generate and maintain data structures which include information for defining boundaries of containers or UI elements of an overlay for a scene in a user interface, X and Y coordinates for each container, a width and a height for each container, and a prominence value of each container as well as a configuration of the containers of the overlay for the scene based at least in part on user input, the overlay module 1530 may be configured to identify a scene in a content stream based at least in part on the user interface elements included in the content stream and scene, and transmit instructions for updating the scene of the content stream to incorporate the overlay with the one or more containers which enables a user to provide input to place an overlay UI element in a container based on associated prominence value for the containers. In embodiments, the overlay module 1530 may be configured to identify boundaries and positions of user interface elements in a scene of a content stream based at least in part on an edge detection algorithm, determine prominence values for an area of the user interface that includes the user interface elements based on aggregate user input for the scene, and transmit instructions for updating the scene in the user interface to incorporate an overlay that includes containers that correspond to the areas of the user interface that enable a user to provide input to place an overlay element in a particular container based on the prominence value for the container. In embodiments, the overlay module 1530 may be configured to invoke an API call for requesting, from a video game application of the content streaming computer (streaming device 1532), information that identifies boundaries of one or more UI elements in a scene of a content stream, positions of the UI elements, and prominence values for the UI elements.

The architecture of FIG. 15 also includes a streaming device 1532 that further includes a processor 1534, memory 1536, a browser application 1538, and the overlay module 1530. The streaming device 1532 may be an example of a user device 1504 and the configuration and functionality of components 1534, 1536, and 1538 are disclosed above with respect to browser application 1506, memory 1510, processor 1512, and overlay module 1530. In embodiments, content providers (not pictured) may interact with the streaming device 1532 to provide content streams and input which is used to generate data structures for generating an overlay to incorporate into the content stream and enable the content provider to place overlay UI elements into areas or containers of the overlay which do not obscure certain portions of the UI from a viewer's standpoint (e.g., the user 1502 consuming the content stream via user device 1504). In embodiments, the overlay module 1530 may be configured to invoke an API call from a video game application of the streaming device 1532 to obtain that identifies boundaries of one or more UI elements in a scene of a content stream, positions of the UI elements, and prominence values for the UI elements, which is transmitted, via networks 1508, to service provider computers 1504. Content providers may interact with streaming devices 1532 to place overlay UI elements into a user interface that is presenting the content stream as well as feedback which identifies where and what size overlay UI elements can be presented within the UI of the content stream according to the overlay modification features described herein.

Figure 16:
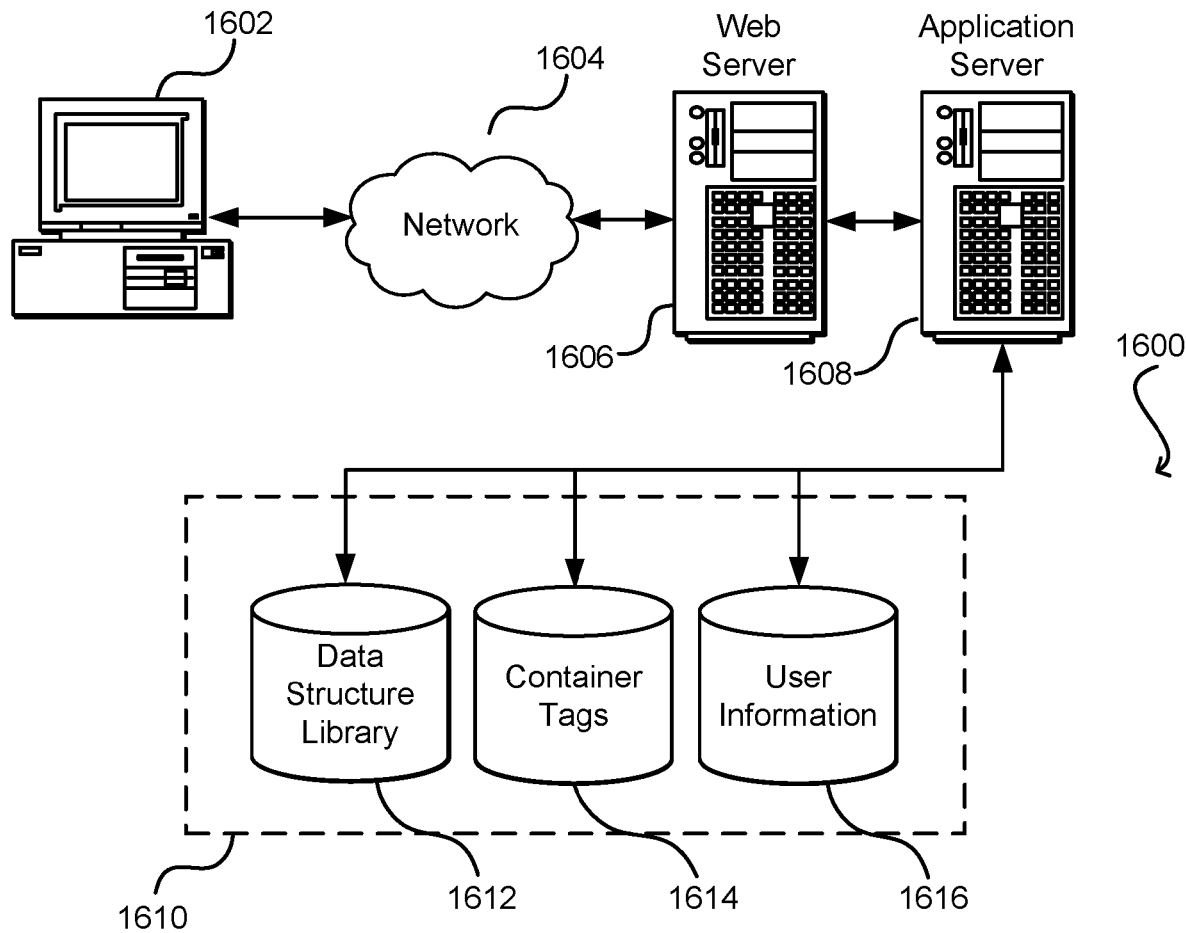
FIG. 16 illustrates an environment in which various embodiments can be implemented.

FIG. 16 illustrates aspects of an example environment 1600 for implementing aspects in accordance with various embodiments. As will be appreciated, although a Web-based environment is used for purposes of explanation, different environments may be used, as appropriate, to implement various embodiments. The environment includes an electronic client device 1602, which can include any appropriate device operable to send and receive requests, messages, or information over an appropriate network 1604 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1606 for receiving requests and serving content in response thereto, although for other networks an alternative device serving a similar purpose could be used as would be apparent to one of ordinary skill in the art.

The illustrative environment includes at least one application server 1608 and a data store 1610. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1602 and the application server 1608, can be handled by the Web server. It should be understood that the Web and application servers are not required and are merely example components, as structured code discussed herein can be executed on any appropriate device or host machine as discussed elsewhere herein.

The data store 1610 can include several separate data tables, databases or other data storage mechanisms and media for storing data relating to a particular aspect. For example, the data store illustrated includes mechanisms for storing data structure library information 1612 and user information 1616, which can be used to serve content for the production side, and maintain one or more data structures for identifying boundaries, positions, sizes, prominence values, and tags for containers or areas of scene for content, as well as store user information regarding preferences of resizing content to fit in containers. The data store also is shown to include a mechanism for storing container tags 1614, which can be used for reporting, analysis, or other such purposes such as maintaining tags associated with different areas or containers of an overlay for a scene for content. It should be understood that there can be many other aspects that may need to be stored in the data store, such as for page image information and to access right information, which can be stored in any of the above listed mechanisms as appropriate or in additional mechanisms in the data store 1610. The data store 1610 is operable, through logic associated therewith, to receive instructions from the application server 1608 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1602. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 14. Thus, the depiction of the system 1400 in FIG. 14 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   receiving, by a server computer, a content stream provided by a content streaming computer;
   identifying, by the server computer, a scene in the content stream based at least in part on positions of one or more user interface elements included in the content stream and content of the one or more user interface elements included in the scene of the content stream;
   obtaining, by the server computer, a particular data structure from a library of data structures based at least in part on the scene and the content stream, the particular data structure for the scene defining boundaries for one or more containers of an overlay for the scene in a user interface, X and Y coordinates associated with each container of the one or more containers, a width and a height for each container of the one or more containers corresponding to the user interface, and a prominence value each container of the one or more containers, a configuration of the one or more containers of the overlay for the scene and the prominence values for the one or more containers based at least in part on user input, the prominence value representing a priority to present, from a view point of a viewer of the content stream, a corresponding area associated with a user interface element of the one or more user interface elements of the scene unobscured from the one or more containers of the overlay for the scene; and transmitting, by the server computer and to the content streaming computer, instructions for updating the scene in the user interface to incorporate the one or more containers of the overlay in the configuration that enables a user to place an overlay user interface element in a container of the one or more containers based at least in part on an associated prominence value for the container.

2. The computer-implemented method of claim 1, wherein the prominence value is visually represented, in the user interface, as a color gradient.

3. The computer-implemented method of claim 1, wherein updating the scene in the user interface includes presenting a visual representation of the boundaries for the one or more containers in the scene.

4. The computer-implemented method of claim 1, wherein the library of data structures comprises a plurality of data structures associated with different scenes for the content stream.

5. A computer-implemented method, comprising:
identifying, by a server computer, a scene in a first content stream based at least in part on positions of one or more visual elements included in the first content stream and content of the one or more user interface elements included in the scene of the first content stream;
identifying, by the server computer, boundaries and the positions of the one or more visual elements in the scene based at least in part on an edge detection algorithm;
determining, by the server computer, a prominence value for a container that corresponds to an area of a user interface that includes the one or more visual elements based at least in part on aggregate user input for the scene, the prominence value representing a priority to present, from a view point of a viewer of the first content stream, a corresponding area associated with a visual element of the one or more visual elements of the scene unobscured from an overlay user interface element of an overlay; and
transmitting, by the server computer and to a user device, instructions for updating the scene in the user interface to incorporate the overlay that includes containers that correspond to areas of the user interface, the overlay enabling a user to provide first input to place the overlay user interface element in a particular container based at least in part on the prominence value for the particular container.

6. The computer-implemented method of claim 5, further comprising associating a tag with each container of the containers, the tag identified based at least in part on the aggregate user input.

7. The computer-implemented method of claim 6, wherein determining the prominence value for the container is further based at least in part on the tag associated with the container.

8. The computer-implemented method of claim 5, further comprising resizing the overlay user interface element based at least in part on a size of the overlay user interface element and the boundaries of the particular container.

9. The computer-implemented method of claim 5, further comprising removing a portion of the overlay user interface element based at least in part on a size of the overlay user interface element and the boundaries of the particular container.

10. The computer-implemented method of claim 5, further comprising updating placement of the overlay user interface element to a previous position within the user interface based at least in part on the prominence value for the particular container.

11. The computer-implemented method of claim 5, further comprising:
receiving, by the server computer, a second content stream; and
incorporating, by the server computer, the second content stream into the first content stream.

12. The computer-implemented method of claim 5, wherein the overlay is further configured to remove the second content stream from the user interface based at least in part on second input from a viewer of the first content stream and the second content stream.

13. A computer system comprising:
a memory configured to store computer-executable instructions; and
a processor in communication with the memory configured to execute the computer-executable instructions to at least:
receive a content stream of a video game application provided by a content streaming computer;
invoke an application programming interface (API) call for requesting, from the video game application of the content streaming computer, information that identifies boundaries of one or more user interface elements in a scene of the content stream, positions of the one or more user interface elements in the scene, and prominence values of the one or more user interface elements, a prominence value of the prominence values representing a priority to present, from a view point of a viewer of the content stream, a corresponding area of a user interface associated with a user interface element of the one or more user interface elements of the scene unobscured from an overlay user interface element of an overlay; and
generate the overlay that includes one or more areas of a user interface that presents the scene that enables a user to provide first input to place the overlay user interface element in an area of the one or more areas based at least in part on the information.

14. The computer system of claim 13, wherein the processor is further configured to generate a visual representation of the boundaries and size of a container that corresponds to the area in response to the first input to place the overlay user interface element in the area based at least in part on a corresponding prominence value of the prominence values for the area.

15. The computer system of claim 13, wherein the processor is further configured to update the user interface to visually represent one or more containers that are associated with the one or more areas, the associated boundaries, sizes, and the prominence values for the one or more containers in response to receiving the first input to place the overlay user interface element in the area.

16. The computer system of claim 13, wherein the processor is further configured to update the overlay to change a size of a particular container associated with the area based at least in part on second input from the user and prominence values of the one or more user interface elements.

17. The computer system of claim 13, wherein the processor is further configured to update the overlay based at least in part on updated information received in response to a periodic invocation of the API call from the video game application of the content streaming computer.

18. The computer system of claim 13, wherein the processor is further configured to:
    receive, from the video game application, an indication of a change of the scene in the content stream; and
    invoke the API call to request updated information.

19. The computer system of claim 13, wherein the processor is further configured to update the prominence values for the one or more areas based at least in part on aggregate user input.

* * * * *